US012463752B2

(12) United States Patent
Zhou et al.

(10) Patent No.: US 12,463,752 B2
(45) Date of Patent: Nov. 4, 2025

(54) FEEDBACK BASED ON INDICATED FEEDBACK PROCESS IDENTIFIERS

(71) Applicant: QUALCOMM INCORPORATED, San Diego, CA (US)

(72) Inventors: Yan Zhou, San Diego, CA (US); Konstantinos Dimou, New York, NY (US); Yi Huang, San Diego, CA (US); Jing Sun, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/262,371

(22) PCT Filed: Mar. 22, 2022

(86) PCT No.: PCT/US2022/021421
§ 371 (c)(1),
(2) Date: Jul. 20, 2023

(87) PCT Pub. No.: WO2022/204204
PCT Pub. Date: Sep. 29, 2022

(65) Prior Publication Data
US 2024/0097825 A1 Mar. 21, 2024

(30) Foreign Application Priority Data
Mar. 24, 2021 (GR) .............................. 20210100187

(51) Int. Cl.
*H04L 1/1607* (2023.01)
*H04L 1/1822* (2023.01)
(52) U.S. Cl.
CPC .......... *H04L 1/1614* (2013.01); *H04L 1/1822* (2013.01)

(58) Field of Classification Search
None
See application file for complete search history.

(56) References Cited

U.S. PATENT DOCUMENTS 10,986,695 B1 * 4/2021 Babaei .............. H04W 72/1268
2016/0043854 A1 * 2/2016 Damnjanovic ....... H04L 1/1854
(Continued)

FOREIGN PATENT DOCUMENTS

EP         2501057 A1 *  9/2012 ........... H04B 7/2606
EP         3269193 B1 * 12/2018 ........... H04L 1/1887
WO   WO-2019072074 A1 *  4/2019 ........... H04B 7/0456

OTHER PUBLICATIONS

International Search Report and Written Opinion—PCT/US2022/021421—ISA/EPO—Jun. 20, 2022.
(Continued)

*Primary Examiner* — Guerrier Merant
(74) *Attorney, Agent, or Firm* — Holland & Hart LLP

(57) ABSTRACT

Methods, systems, and devices for wireless communications are described. For instance, a network entity may transmit, to a user equipment Transmission (UE), control signaling indicating that the UE is to provide feedback corresponding to a set of feedback process identifiers for at least one component carrier. The network entity may transmit, to the UE, a cancellation indication Feedback Message that cancels a scheduled uplink transmission in which the UE is scheduled to provide feedback data corresponding to a subset of the set of feedback process identifiers. The network entity may transmit, to the UE, a control message scheduling the UE to transmit the feedback data corresponding to the subset of the set of feedback process identifiers (e.g., based on the cancellation indication). The UE may transmit, to the network entity, a feedback message including the feedback data for the subset based on the control message.

28 Claims, 18 Drawing Sheets

(56) References Cited

U.S. PATENT DOCUMENTS

| | | | | |
|---|---|---|---|---|
| 2019/0074937 A1* | 3/2019 | Bhattad | ............... | H04L 1/1896 |
| 2019/0075573 A1* | 3/2019 | Kwon | ............... | H04W 72/046 |
| 2020/0107356 A1* | 4/2020 | Rico Alvarino | ...... | H04W 72/21 |
| 2020/0366415 A1 | 11/2020 | Khoshnevisan et al. | | |
| 2022/0191927 A1* | 6/2022 | Hedayat | ............. | H04W 74/002 |
| 2023/0171038 A1* | 6/2023 | Yang | .................... | H04L 5/0055 |
| | | | | 370/329 |

OTHER PUBLICATIONS

Qualcomm Incorporated: "Enhancements to Scheduling and HARQ Operation for NR-U", 3GPP TSG RAN WG1 Meeting #97, R1-1907263, 7.2.2.2.3, 3rd Generation Partnership Project, Mobile Competence Centre, 650, Route Des Lucioles, F-06921, Sophia-Antipolis Cedex, France, vol. RAN WG1, No. Reno, US, May 13, 2019-May 17, 2019, May 13, 2019, XP051728703, 12 pages.

\* cited by examiner

FEEDBACK BASED ON INDICATED FEEDBACK PROCESS IDENTIFIERS

CROSS REFERENCE

The present application is a 371 national stage filing of International PCT Application No. 20210100187 by Zhou et al. entitled "FEEDBACK BASED ON INDICATED FEEDBACK PROCESS IDENTIFIERS," filed Mar. 24, 2021; and claims priority to International Patent Application No. PCT/US2022/021421 by Zhou et al. entitled "FEEDBACK BASED ON INDICATED FEEDBACK PROCESS IDENTIFIERS," filed Mar. 22, 2022, each of which is assigned to the assignee hereof, and each of which is expressly incorporated by reference in its entirety herein.

TECHNICAL FIELD

The following relates to wireless communications, including feedback based on indicated feedback process identifiers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may provide feedback for each hybrid automatic repeat request (HARD) process of each component carrier (CC). However, as the number of CCs and/or HARQ processes increases, the latency associated with such feedback may also increase. Increased latency may decrease the efficiency of wireless communications.

SUMMARY

The described techniques relate to improved methods, systems, devices, and apparatuses that support feedback based on indicated feedback process identifiers. In some examples, a UE may provide feedback for each feedback process (e.g., each hybrid automatic repeat request (HARQ) process) of each component carrier (CC). However, as the number of CCs and/or feedback processes increases, the latency associated with such feedback may also increase. Increased latency may decrease the efficiency of wireless communications. In order to reduce the latency, a UE may transmit a subset of the set of the total set of feedback processes for the component carriers.

For instance, the described techniques provide for a user equipment (UE) to transmit feedback data for a set of feedback process identifiers to a network entity (e.g., base station) when the UE has received a cancellation indication canceling a scheduled uplink transmission in which the UE is configured to provide the feedback data. For instance, network entity may transmit, to a UE, control signaling indicating that the UE is to provide feedback corresponding to a set of feedback process identifiers for at least one component carrier. The network entity may transmit, to the UE, a cancellation indication that cancels a scheduled uplink transmission in which the UE is scheduled to provide feedback data corresponding to a subset of the set of feedback process identifiers. The network entity may transmit, to the UE, a control message scheduling the UE to transmit the feedback data corresponding to the subset of the set of feedback process identifiers based on the cancellation indication. The UE may transmit, to the network entity, a feedback message including the feedback data for the subset of the set of feedback process identifiers based on the control message.

A method for wireless communication at a user equipment (UE) is described. The method may include receiving, from a network entity, control signaling indicating that the UE is to provide feedback corresponding to a set of multiple feedback process identifiers for at least one component carrier, receiving, from the network entity, a cancellation indication that cancels a scheduled uplink transmission in which the UE is scheduled to provide feedback data corresponding to a subset of the set of multiple feedback process identifiers, receiving, from the network entity, a control message scheduling the UE to transmit the feedback data corresponding to the subset of the set of multiple feedback process identifiers based on the cancellation indication, and transmitting, to the network entity, a feedback message including the feedback data for the subset of the set of multiple feedback process identifiers based on the control message.

An apparatus for wireless communication at a UE is described. The apparatus may include at least one processor, memory coupled (e.g., operatively, communicatively, functionally, electronically, or electrically) to or with the at least one processor, and the memory storing instructions executable by the at least one processor to cause the apparatus to receive, from a network entity, control signaling indicating that the UE is to provide feedback corresponding to a set of multiple feedback process identifiers for at least one component carrier, receive, from the network entity, a cancellation indication that cancels a scheduled uplink transmission in which the UE is scheduled to provide feedback data corresponding to a subset of the set of multiple feedback process identifiers, receive, from the network entity, a control message scheduling the UE to transmit the feedback data corresponding to the subset of the set of multiple feedback process identifiers based on the cancellation indication, and transmit, to the network entity, a feedback message including the feedback data for the subset of the set of multiple feedback process identifiers based on the control message.

Another apparatus for wireless communication at a UE is described. The apparatus may include means for receiving, from a network entity, control signaling indicating that the UE is to provide feedback corresponding to a set of multiple feedback process identifiers for at least one component carrier, means for receiving, from the network entity, a cancellation indication that cancels a scheduled uplink transmission in which the UE is scheduled to provide feedback data corresponding to a subset of the set of multiple feedback process identifiers, means for receiving, from the network entity, a control message scheduling the UE to transmit the feedback data corresponding to the subset of the set of multiple feedback process identifiers based on the cancellation indication, and means for transmitting, to the network entity, a feedback message including the feedback data for the subset of the set of multiple feedback process identifiers based on the control message.

A non-transitory computer-readable medium storing code for wireless communication at a UE is described. The code may include instructions executable by at least one processor to receive, from a network entity, control signaling indicating that the UE is to provide feedback corresponding to a set of multiple feedback process identifiers for at least one component carrier, receive, from the network entity, a cancellation indication that cancels a scheduled uplink transmission in which the UE is scheduled to provide feedback data corresponding to a subset of the set of multiple feedback process identifiers, receive, from the network entity, a control message scheduling the UE to transmit the feedback data corresponding to the subset of the set of multiple feedback process identifiers based on the cancellation indication, and transmit, to the network entity, a feedback message including the feedback data for the subset of the set of multiple feedback process identifiers based on the control message.

In some examples of the method, apparatuses, and non-transitory computer-readable medium described herein, receiving the control message may include operations, features, means, or instructions for receiving the control message including a bitmap indicating a first feedback process identifier of the subset of the set of multiple feedback process identifiers.

In some examples of the method, apparatuses, and non-transitory computer-readable medium described herein, receiving the control message may include operations, features, means, or instructions for receiving the control message including a set of multiple bitmaps that respectively correspond to a set of multiple component carriers.

In some examples of the method, apparatuses, and non-transitory computer-readable medium described herein, receiving the control message may include operations, features, means, or instructions for receiving the control message including a bitmap, where a first bit of the bitmap corresponds to a first feedback process identifier for each component carrier of a set of multiple component carriers in which the first feedback process identifier may be configured.

In some examples of the method, apparatuses, and non-transitory computer-readable medium described herein, transmitting the feedback message may include operations, features, means, or instructions for transmitting the feedback message including the feedback data for each component carrier of the set of multiple component carriers in which the first feedback process identifier may be configured based on the first bit having a first value.

In some examples of the method, apparatuses, and non-transitory computer-readable medium described herein, receiving the control message comprising a bitmap, where each bit in the bitmap corresponds to a respective feedback process identifier of the plurality of feedback process identifiers, where each feedback process identifier corresponding to a bit in the bitmap is in a same position of a respective order relative to a respective component carrier.

In some examples of the method, apparatuses, and non-transitory computer-readable medium described herein, receiving the control message may include operations, features, means, or instructions for receiving the control message including a bitmap, where a first bit of the bitmap corresponds to a first feedback process identifier for a first component carrier and a second bit of the bitmap corresponds to a second feedback process identifier for a second component carrier.

In some examples of the method, apparatuses, and non-transitory computer-readable medium described herein, transmitting the feedback message may include operations, features, means, or instructions for transmitting the feedback message including the feedback data for the first component carrier based on the first bit having a first value, for the second component carrier based on the second bit having the first value, or both.

In some examples of the method, apparatuses, and non-transitory computer-readable medium described herein, receiving the control message may include operations, features, means, or instructions for receiving the control message including a list or a range indicating the subset of the set of multiple feedback process identifiers corresponding to a single component carrier or that may be common to a set of multiple component carriers.

In some examples of the method, apparatuses, and non-transitory computer-readable medium described herein, transmitting the feedback message may include operations, features, means, or instructions for transmitting the feedback message including first feedback bits corresponding to a first feedback process identifier concatenated with second feedback bits corresponding to a second feedback process identifier.

In some examples of the method, apparatuses, and non-transitory computer-readable medium described herein, receiving the control message may include operations, features, means, or instructions for receiving the control message including an indication of a type of feedback codebook, where the feedback data may be generated in accordance with the indicated type of the feedback codebook.

In some examples of the method, apparatuses, and non-transitory computer-readable medium described herein, receiving the control message may include operations, features, means, or instructions for receiving downlink control information including the control message, medium access control (MAC) control element signaling including the control message, or radio resource control signaling including the control message.

In some examples of the method, apparatuses, and non-transitory computer-readable medium described herein, receiving the cancellation indication may include operations, features, means, or instructions for receiving downlink control information including the cancellation indication.

In some examples of the method, apparatuses, and non-transitory computer-readable medium described herein, transmitting the feedback message may include operations, features, means, or instructions for transmitting an uplink control channel transmission including the feedback message.

A method for wireless communication at a network entity (e.g., a base station) is described. The method may include transmitting, to a UE, control signaling indicating that the UE is to provide feedback corresponding to a set of multiple feedback process identifiers for at least one component carrier, transmitting, to the UE, a cancellation indication indicating cancellation of a scheduled uplink transmission in which the UE is scheduled to provide feedback data corresponding to a subset of the set of multiple feedback process identifiers, transmitting, to the UE, a control message scheduling the UE to transmit the feedback data corresponding to the subset of the set of multiple feedback process identifiers based on the cancellation indication, and receiving, from the UE, a feedback message including the feedback data for the subset of the set of multiple feedback process identifiers based on the control message.

An apparatus for wireless communication at a network entity is described. The apparatus may include at least one processor, memory coupled (e.g., operatively, communicatively, functionally, electronically, or electrically) to the at least one processor, and the memory storing instructions executable by the at least one processor to cause the apparatus to transmit, to a UE, control signaling indicating that the UE is to provide feedback corresponding to a set of multiple feedback process identifiers for at least one component carrier, transmit, to the UE, a cancellation indication indicating cancellation of a scheduled uplink transmission in which the UE is scheduled to provide feedback data corresponding to a subset of the set of multiple feedback process identifiers, transmit, to the UE, a control message scheduling the UE to transmit the feedback data corresponding to the subset of the set of multiple feedback process identifiers based on the cancellation indication, and receive, from the UE, a feedback message including the feedback data for the subset of the set of multiple feedback process identifiers based on the control message.

Another apparatus for wireless communication at a network entity is described. The apparatus may include means for transmitting, to a UE, control signaling indicating that the UE is to provide feedback corresponding to a set of multiple feedback process identifiers for at least one component carrier, means for transmitting, to the UE, a cancellation indication indicating cancellation of a scheduled uplink transmission in which the UE is scheduled to provide feedback data corresponding to a subset of the set of multiple feedback process identifiers, means for transmitting, to the UE, a control message scheduling the UE to transmit the feedback data corresponding to the subset of the set of multiple feedback process identifiers based on the cancellation indication, and means for receiving, from the UE, a feedback message including the feedback data for the subset of the set of multiple feedback process identifiers based on the control message.

A non-transitory computer-readable medium storing code for wireless communication at a network entity is described. The code may include instructions executable by at least one processor to transmit, to a UE, control signaling indicating that the UE is to provide feedback corresponding to a set of multiple feedback process identifiers for at least one component carrier, transmit, to the UE, a cancellation indication indicating cancellation of a scheduled uplink transmission in which the UE is scheduled to provide feedback data corresponding to a subset of the set of multiple feedback process identifiers, transmit, to the UE, a control message scheduling the UE to transmit the feedback data corresponding to the subset of the set of multiple feedback process identifiers based on the cancellation indication, and receive, from the UE, a feedback message including the feedback data for the subset of the set of multiple feedback process identifiers based on the control message.

In some examples of the method, apparatuses, and non-transitory computer-readable medium described herein, transmitting the control message may include operations, features, means, or instructions for transmitting the control message including a bitmap indicating a first feedback process identifier of the subset of the set of multiple feedback process identifiers.

In some examples of the method, apparatuses, and non-transitory computer-readable medium described herein, transmitting the control message may include operations, features, means, or instructions for transmitting the control message including a set of multiple bitmaps that respectively correspond to a set of multiple component carriers.

In some examples of the method, apparatuses, and non-transitory computer-readable medium described herein, transmitting the control message may include operations, features, means, or instructions for transmitting the control message including a bitmap, where a first bit of the bitmap corresponds to a first feedback process identifier for each component carrier of a set of multiple component carriers in which the first feedback process identifier may be configured.

In some examples of the method, apparatuses, and non-transitory computer-readable medium described herein, receiving the feedback message may include operations, features, means, or instructions for receiving the feedback message including the feedback data for each component carrier of the set of multiple component carriers in which the first feedback process identifier may be configured based on the first bit having a first value.

In some examples of the method, apparatuses, and non-transitory computer-readable medium described herein, transmitting the control message may include operations, features, means, or instructions for transmitting the control message including a bitmap, where each bit in the bitmap corresponds to a respective feedback process identifier of the plurality of feedback process identifiers, where each feedback process identifier corresponding to a bit in the bitmap is in a same position of a respective order relative to a respective component carrier.

In some examples of the method, apparatuses, and non-transitory computer-readable medium described herein, transmitting the control message may include operations, features, means, or instructions for transmitting the control message including a bitmap, where a first bit of the bitmap corresponds to a first feedback process identifier for a first component carrier and a second bit of the bitmap corresponds to a second feedback process identifier for a second component carrier.

In some examples of the method, apparatuses, and non-transitory computer-readable medium described herein, receiving the feedback message may include operations, features, means, or instructions for receiving the feedback message including the feedback data for the first component carrier based on the first bit having a first value, for the second component carrier based on the second bit having the first value, or both.

In some examples of the method, apparatuses, and non-transitory computer-readable medium described herein, transmitting the control message may include operations, features, means, or instructions for transmitting the control message including a list or a range indicating the subset of the set of multiple feedback process identifiers corresponding to a single component carrier or that may be common to a set of multiple component carriers.

In some examples of the method, apparatuses, and non-transitory computer-readable medium described herein, receiving the feedback message may include operations, features, means, or instructions for receiving the feedback message including first feedback bits corresponding to a first feedback process identifier concatenated with second feedback bits corresponding to a second feedback process identifier.

In some examples of the method, apparatuses, and non-transitory computer-readable medium described herein, transmitting the control message may include operations, features, means, or instructions for transmitting the control message including an indication of a type of feedback codebook, where the feedback data may be associated with the indicated type of the feedback codebook.

In some examples of the method, apparatuses, and non-transitory computer-readable medium described herein, transmitting the control message may include operations, features, means, or instructions for transmitting downlink control information including the control message, medium access control (MAC) control element signaling including the control message, or radio resource control signaling including the control message.

In some examples of the method, apparatuses, and non-transitory computer-readable medium described herein, transmitting the cancellation indication may include operations, features, means, or instructions for transmitting downlink control information including the cancellation indication.

In some examples of the method, apparatuses, and non-transitory computer-readable medium described herein, receiving the feedback message may include operations, features, means, or instructions for receiving an uplink control channel transmission including the feedback message.

A method for wireless communication at a user equipment (UE) is described. The method may include receiving, from a network entity, control signaling indicating that the UE is to provide feedback corresponding to a set of multiple feedback process identifiers for at least one component carrier, receiving, from the network entity, a control message scheduling the UE to transmit feedback data corresponding to a subset of the set of multiple feedback process identifiers, where the subset of the set of multiple feedback process identifiers excludes at least one feedback process identifier of the set of multiple feedback process identifiers, and transmitting, to the network entity, a feedback message including the feedback data for the subset of the set of multiple feedback process identifiers based on the control message.

An apparatus for wireless communication at a UE is described. The apparatus may include a processor, memory coupled with the processor, and instructions stored in the memory. The instructions may be executable by the processor to cause the apparatus to receive, from a network entity, control signaling indicating that the UE is to provide feedback corresponding to a set of multiple feedback process identifiers for at least one component carrier, receive, from the network entity, a control message scheduling the UE to transmit feedback data corresponding to a subset of the set of multiple feedback process identifiers, where the subset of the set of multiple feedback process identifiers excludes at least one feedback process identifier of the set of multiple feedback process identifiers, and transmit, to the network entity, a feedback message including the feedback data for the subset of the set of multiple feedback process identifiers based on the control message.

Another apparatus for wireless communication at a UE is described. The apparatus may include means for receiving, from a network entity, control signaling indicating that the UE is to provide feedback corresponding to a set of multiple feedback process identifiers for at least one component carrier, means for receiving, from the network entity, a control message scheduling the UE to transmit feedback data corresponding to a subset of the set of multiple feedback process identifiers, where the subset of the set of multiple feedback process identifiers excludes at least one feedback process identifier of the set of multiple feedback process identifiers, and means for transmitting, to the network entity, a feedback message including the feedback data for the subset of the set of multiple feedback process identifiers based on the control message.

A non-transitory computer-readable medium storing code for wireless communication at a UE is described. The code may include instructions executable by a processor to receive, from a network entity, control signaling indicating that the UE is to provide feedback corresponding to a set of multiple feedback process identifiers for at least one component carrier, receive, from the network entity, a control message scheduling the UE to transmit feedback data corresponding to a subset of the set of multiple feedback process identifiers, where the subset of the set of multiple feedback process identifiers excludes at least one feedback process identifier of the set of multiple feedback process identifiers, and transmit, to the network entity, a feedback message including the feedback data for the subset of the set of multiple feedback process identifiers based on the control message.

Some examples of the method, apparatuses, and non-transitory computer-readable medium described herein may further include operations, features, means, or instructions for receiving, from the network entity, a cancellation indication that cancels a scheduled uplink transmission in which the UE may be scheduled to provide feedback data corresponding to a subset of the set of multiple feedback process identifiers, where receiving the control message scheduling the UE to transmit the feedback data corresponding to the subset of the set of multiple feedback process identifiers may be based on the cancellation indication.

A method for wireless communication at a network entity is described. The method may include transmitting, to a UE, control signaling indicating that the UE is to provide feedback corresponding to a set of multiple feedback process identifiers for at least one component carrier, transmitting, to the UE, a control message scheduling the UE to transmit the feedback data corresponding to a subset of the set of multiple feedback process identifiers, where the subset of the set of multiple feedback process identifiers excludes at least one feedback process identifier of the set of multiple feedback process identifiers, and receiving, from the UE, a feedback message including the feedback data for the subset of the set of multiple feedback process identifiers based on the control message.

An apparatus for wireless communication at a network entity is described. The apparatus may include a processor, memory coupled with the processor, and instructions stored in the memory. The instructions may be executable by the processor to cause the apparatus to transmit, to a UE, control signaling indicating that the UE is to provide feedback corresponding to a set of multiple feedback process identifiers for at least one component carrier, transmit, to the UE, a control message scheduling the UE to transmit the feedback data corresponding to a subset of the set of multiple feedback process identifiers, where the subset of the set of multiple feedback process identifiers excludes at least one feedback process identifier of the set of multiple feedback process identifiers, and receive, from the UE, a feedback message including the feedback data for the subset of the set of multiple feedback process identifiers based on the control message.

Another apparatus for wireless communication at a network entity is described. The apparatus may include means for transmitting, to a UE, control signaling indicating that the UE is to provide feedback corresponding to a set of multiple feedback process identifiers for at least one component carrier, means for transmitting, to the UE, a control message scheduling the UE to transmit the feedback data corresponding to a subset of the set of multiple feedback process identifiers, where the subset of the set of multiple feedback process identifiers excludes at least one feedback process identifier of the set of multiple feedback process identifiers, and means for receiving, from the UE, a feedback message including the feedback data for the subset of the set of multiple feedback process identifiers based on the control message.

A non-transitory computer-readable medium storing code for wireless communication at a network entity is described. The code may include instructions executable by a processor to transmit, to a UE, control signaling indicating that the UE is to provide feedback corresponding to a set of multiple feedback process identifiers for at least one component carrier, transmit, to the UE, a control message scheduling the UE to transmit the feedback data corresponding to a subset of the set of multiple feedback process identifiers, where the subset of the set of multiple feedback process identifiers excludes at least one feedback process identifier of the set of multiple feedback process identifiers, and receive, from the UE, a feedback message including the feedback data for the subset of the set of multiple feedback process identifiers based on the control message.

DETAILED DESCRIPTION

Figure 1:
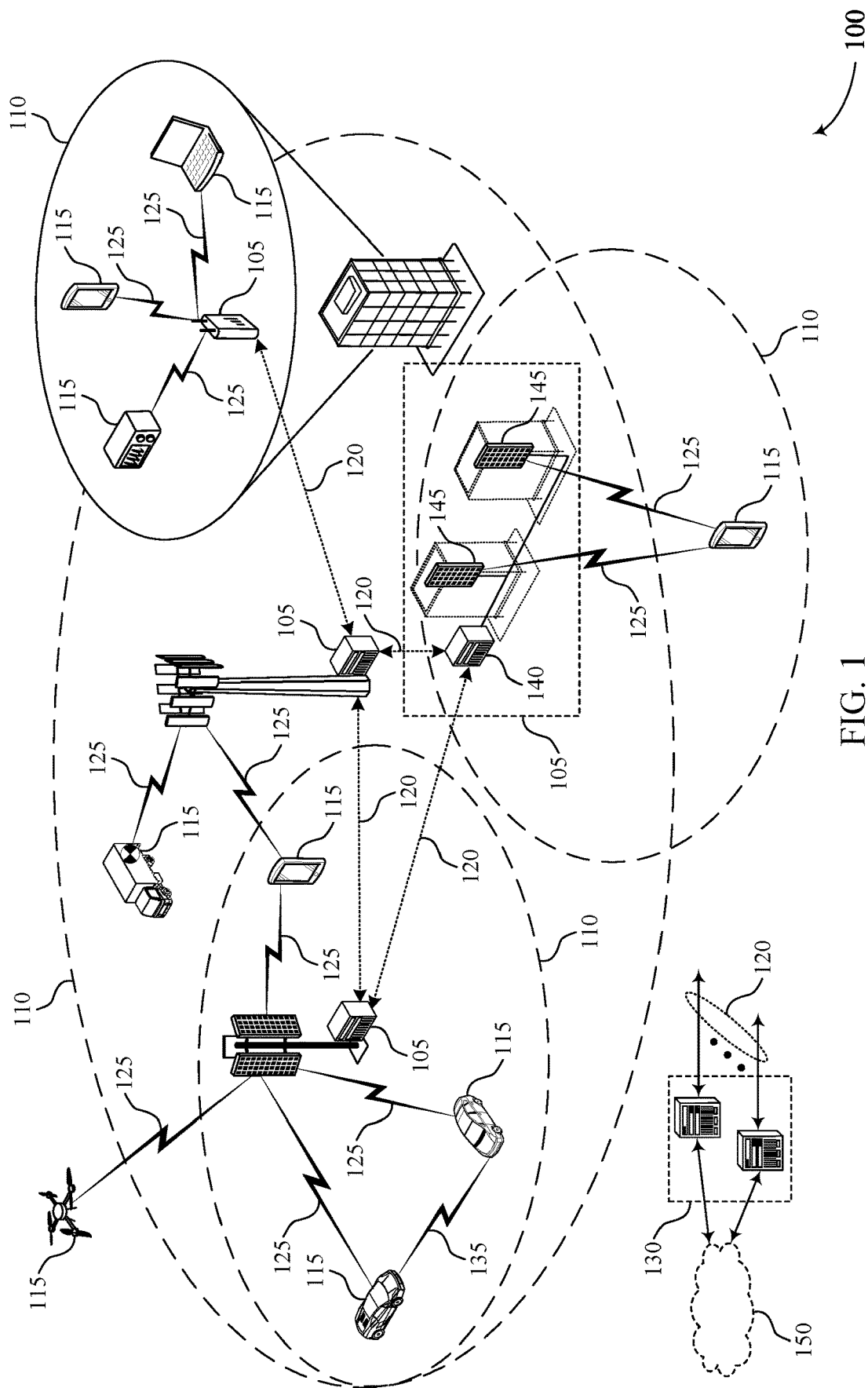
FIG. 1 illustrates an example of a wireless communications system that supports feedback based on indicated feedback process identifiers in accordance with aspects of the present disclosure.

A network entity (e.g., a base station) may communicate with a user equipment (UE). For instance, the network entity may transmit one or more data transmissions to the UE. In some examples, the network entity may schedule an uplink transmission at the UE that the UE may use to provide feedback for a feedback process identifier (e.g., hybrid automatic repeat request (HARQ) process identifier) associated with each of the one or more data transmissions. However, in some examples, the network entity may transmit a cancellation indication to the UE that cancels the scheduled uplink transmission.

In order to enable the UE to transmit the feedback after cancelling the uplink transmission, the network entity may transmit a control message to the UE instructing the UE to transmit a feedback message including the feedback using a Type3 codebook. When using the Type3 codebook, the UE may include feedback for a set of feedback process identifiers including each feedback process identifier of each component carrier (CC) over which the UE is configured to communicate. However, the number of feedback process identifiers to be conveyed via the cancelled uplink transmission may be smaller than the total number of feedback process identifiers in the set of feedback process identifiers. Accordingly, the UE may transmit feedback for more feedback process identifiers than those that the UE was scheduled to provide in the cancelled uplink transmission. As the UE transmits feedback for more feedback process identifiers in the feedback message, the feedback message may be associated with increased resource utilization and/or a higher feedback data overhead. Increased resource utilization and/or a higher feedback data overhead may decrease the efficiency of wireless communications.

In order to reduce overhead and/or resource utilization associated with using a Type3 codebook, the control message may include an indication of a subset of the set of feedback process identifiers for which the UE is to include feedback in the feedback message. The network entity may thereby request that the UE provides feedback on the same feedback process identifiers that the UE was scheduled to provide in the cancelled uplink transmission. The network entity may indicate the subset in the control message using a bitmap or a list or range of feedback process identifiers. It should be noted that the techniques described herein may also be used when no cancellation indication is provided. For instance, the UE may receive the scheduling for the uplink transmission and may refrain from transmitting the feedback until the UE receives the control message.

Aspects of the disclosure are initially described in the context of wireless communications systems. Additional aspects of the disclosure are described in the context of a communications scheme and a process flow. Aspects of the disclosure are further illustrated by and described with reference to apparatus diagrams, system diagrams, and flowcharts that relate to feedback based on indicated feedback process identifiers.

FIG. 1 illustrates an example of a wireless communications system 100 that supports feedback based on indicated feedback process identifiers in accordance with aspects of the present disclosure. The wireless communications system 100 may include one or more network entities 105 (e.g., base stations), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Components within a wireless communication system may be coupled (for example, operatively, communicatively, functionally, electronically, and/or electrically) to each other.

The network entities 105 may be dispersed throughout a geographic area to form the wireless communications system 100 and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or a machine type communications (MTC) device, or the like, which may be implemented in various articles such as appliances, drones, robots, vehicles, meters, or the like.

The network entities 105 may communicate with the core network 130, or with one another, or both. For example, the network entities 105 may interface with the core network 130 through one or more backhaul links 120 (e.g., via an S1, N2, N3, or other interface). The network entities 105 may communicate with one another over the backhaul links 120 (e.g., via an X2, Xn, or other interface) either directly (e.g., directly between network entities 105), or indirectly (e.g., via core network 130), or both. In some examples, the backhaul links 120 may be or include one or more wireless links.

One or more of the network entities 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as Cat NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access node controller (ANC) 140. Each ANC 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A network entity 105 may communicate with a UE 115. For instance, the network entity 105 may transmit one or more data transmissions to the UE 115. In some examples, the network entity may schedule an uplink transmission at the UE 115 that the UE 115 may use to provide feedback for a feedback process identifier (e.g., hybrid automatic repeat request (HARQ) process identifier) associated with each of the one or more data transmissions. In some examples, a feedback process identifier may indicate a data transmission to which related feedback (e.g., an acknowledgement (ACK) or negative acknowledgement (NACK)) relates. However, there may be examples where the network entity 105 transmits a cancellation indication to the UE 115 that cancels the scheduled uplink transmission.

In order to enable the UE 115 to transmit the feedback after the UE 115 receives the cancellation indication, the network entity 105 may transmit a control message to the UE 115 instructing the UE 115 to transmit a feedback message including the feedback using a Type3 codebook. When using the Type3 codebook, the UE 115 may include feedback for a set of feedback process identifiers including each feedback process identifier of multiple component carriers (e.g., each component carrier (CC) over which the UE 115 is configured to communicate). However, the number of feedback process identifiers to be conveyed via the cancelled uplink transmission may be smaller than the total number of feedback process identifiers in the set of feedback process identifiers. Accordingly, the UE 115 may transmit feedback for more feedback process identifiers than those that the UE 115 was scheduled to provide in the cancelled uplink transmission. As the UE 115 transmits feedback for more feedback process identifiers in the feedback message, the feedback message may be associated with increased resource utilization and/or a higher feedback data overhead.

In order to reduce overhead and/or resource utilization associated with using a Type3 codebook, the control message may include an indication of a subset of the set of feedback process identifiers which the UE 115 is to include feedback for in the feedback message. The network entity 105 may thereby request that the UE 115 provides feedback on the same feedback process identifiers that the UE 115 was scheduled to provide in the cancelled uplink transmission. The network entity 105 may indicate the subset in the control message using a bitmap or a list or range of feedback process identifiers.

Figure 2:
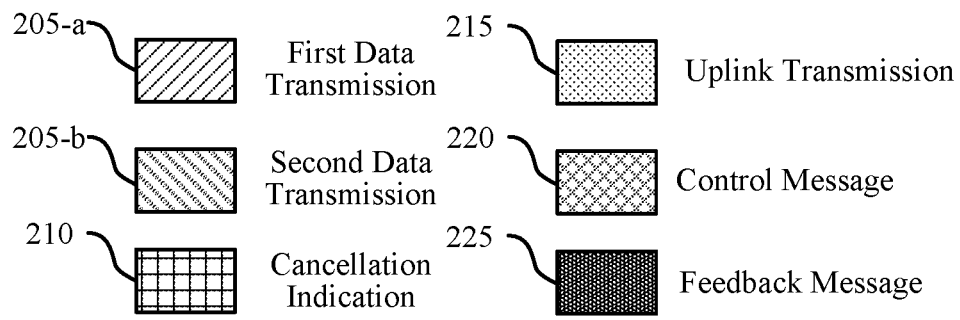
FIG. 2 illustrates an example of a wireless communications system that supports feedback based on indicated feedback process identifiers in accordance with aspects of the present disclosure.
Figure 2:
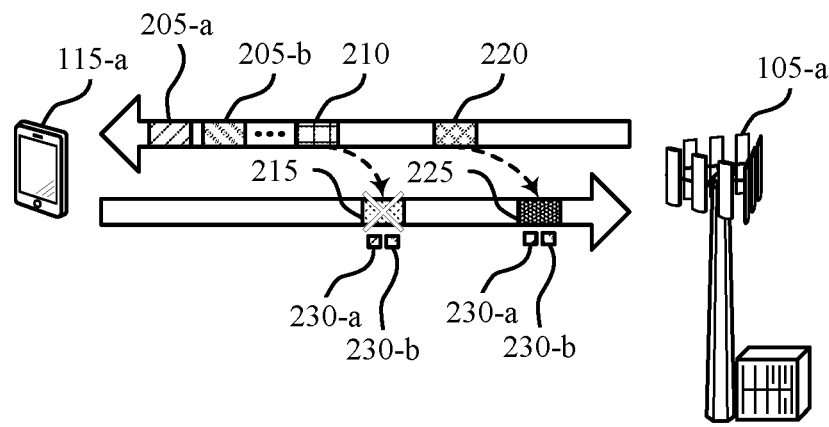

FIG. 2 illustrates an example of a wireless communications system 200 that supports feedback based on indicated feedback process identifiers in accordance with aspects of the present disclosure. In some examples, wireless communications system 200 may be implemented by one or more aspects of wireless communications system 100. For instance, UE 115-a may be an example of a UE 115 as described with reference to FIG. 1 and network entity 105-a may be an example of a network entity 105 as described with reference to FIG. 1.

Network entity 105-a may communicate with UE 115-a. For instance, network entity 105-a may transmit one or more data transmissions to UE 115-a. In the present example, network entity 105-a may transmit first data transmission 205-a and second data transmission 205-b to UE 115-a. In some examples, first data transmission 205-a may be transmitted over a first CC and second data transmission 205-b may be transmitted over a second CC.

In some examples, network entity 105-a may schedule an uplink transmission 215 at UE 115-a that UE 115-a may use to provide feedback for a feedback process identifier (e.g., hybrid automatic repeat request (HARQ) process identifier) associated with each of the one or more data transmissions. For instance, UE 115-a may be scheduled to provide, in the uplink transmission 215, feedback 230-a for a feedback process identifier associated with first data transmission 205-a (e.g., whether the first data transmission 205-a was successfully decoded) in a first CC and to provide feedback 230-b for a feedback process identifier associated with second data transmission 205-b (e.g., whether the second data transmission 205-b was successfully decoded) in a second CC.

In some examples, network entity 105-a may cancel the scheduled uplink transmission 215 (e.g., a physical uplink shared channel (PUSCH) transmission) via a cancellation indication 210 (e.g., which may also be referred to as a cancellation indicator) to free resources for urgent ultra-reliable low-latency communications (URLLC) traffic. However, the cancelled uplink transmission 215 may be scheduled to carry multiplexed feedback (e.g., HARQ acknowledgement/negative acknowledgement (A/N) feedback) for received data transmissions (e.g., physical downlink shared channel (PDSCH) transmissions). For instance, the cancelled uplink transmission 215 may be scheduled to carry feedback 230-a for data transmission 205-a and to carry feedback 230-b for data transmission 205-b. If the feedback (e.g., A/N bits) is lost due to cancellation, network entity 105-a may retransmit the corresponding data transmissions. However, retransmitting the corresponding data transmissions may decrease the efficiency of communications.

To enable UE 115-a to provide the feedback that was scheduled to be conveyed via the uplink transmission 215, network entity 105-a may transmit a control message 220 (e.g., downlink control information (DCI)) to request UE 115-a to transmit a Type3 codebook for each CC configured at UE 115-a. The Type3 codebook may carry feedback (e.g., A/N bits) for each feedback process identifier (e.g., each HARQ process identifier) for each data transmission (e.g., each PDSCH transmission) and for each CC configured at UE 115-*a*. Sending feedback (e.g., A/N bits) for each feedback process identifier (e.g., each HARQ process identifier) may mitigate or avoid codebook misalignment due to a missed detection of a control message (e.g., DCI) scheduling a data transmission (e.g., a PDSCH transmission). However, the Type3 codebook size may exceed a threshold amount. The size of the Type 3 codebook may exceed the threshold amount due to having multiple configured CCs (e.g., 32) and multiple feedback process identifiers for data transmissions per CC (e.g., 16). Accordingly, the techniques described herein may correspond to an enhancement of a Type3 codebook for the use case of retransmission of cancelled feedback (e.g., cancelled HARQ A/N bits).

To enable UE 115-*a* to transmit a reduced amount of feedback, instead of each feedback process identifier being included in the Type3 codebook, network entity 105-*a* may request UE 115-*a* to transmit feedback (e.g., A/N feedback) for a subset of feedback process identifiers. For instance, network entity 105-*a* may transmit a control message 220 that schedules a feedback message 225 that includes the feedback for the subset of feedback process identifiers (e.g., feedback 230-*a* and feedback 230-*b*). In some examples, feedback process identifiers may be examples of HARQ process identifiers, which may be identifiers that indicate a HARQ process associated with a data transmission for which the feedback is being sent. In some examples, UE 115-*a* may transmit A/N feedback based on indicated HARQ identifiers. Transmitting feedback for the subset may reduce (e.g., save) feedback overhead while still mitigating (e.g., avoid) codebook misalignment (e.g., A/N codebook misalignment) due to a failure to detect a downlink control message (e.g., DCI) scheduling a data transmission. For example, if a cancelled uplink transmission 215 (e.g. a PUSCH transmission) carries feedback (e.g., A/N) for a data transmission with a feedback process identifier equal to 3 on a second CC, network entity 105-*a* may request UE 115-*a* to transmit (e.g., send) feedback for that data transmission (e.g., instead of for each feedback process identifier on each CC configured at UE 115-*a*). If UE 115-*a* does not detect the downlink control message (e.g., DCI) scheduling the data transmission, UE 115-*a* may transmit a negative acknowledgement (NACK) for the data transmission.

The feedback process identifier specific feedback (e.g., HARQ identifier specific A/N feedback) may be conveyed in the feedback message 225 according to the feedback process identifiers indicated in the control message 220, which may have one or more formats. For instance, the selected feedback process identifiers may be indicated via a bitmap included in the control message 220 (e.g., when the control message 220 is conveyed via DCI, medium access control (MAC) control element (MAC-CE) signaling, or radio resource control (RRC) signaling). Network entity 105-*a* may indicate a bitmap per configured CC, the bitmap including a bit for each configured feedback process identifier (e.g., each PDSCH HARQ process identifier). For instance, a '1' in the bitmap may indicate that feedback (e.g., A/N feedback) is requested for data transmissions associated with a particular feedback process identifier on that CC.

Additionally or alternatively, instead of a per-CC bitmap, a single common bitmap may be indicated for a group of CC(s) configured at UE 115-*a* with each bit corresponding to a respective feedback process identifier. For instance, each bit may correspond to a common feedback process identifier for each CC configured at UE 115-*a*. In some such examples, if a bit is set as '1', UE 115-*a* may provide feedback for a corresponding feedback process identifier on each CC configured with that feedback process identifier. UE 115-*a* may not send feedback for a CC not configured with that feedback process identifier. Additionally or alternatively, each bit may correspond to a CC-specific feedback process identifier determined based on configured feedback process identifiers on the specific CC. For instance, if the Xth bit of the bitmap is set as '1', UE 115-*a* may provide feedback for the Xth configured feedback process identifier on each CC configured at UE 115-*a*. UE 115-*a* may not send feedback for a CC not having the Xth feedback process identifier (e.g., X is beyond a configured range for the CC). When network entity 105-*a* indicates a bitmap per configured CC, the bitmap including a bit for each configured feedback process identifier (e.g., each PDSCH HARQ process identifier), and/or when network entity 105-*a* indicates a single common bitmap where each bit corresponds to a common feedback process identifier for each CC configured at UE 115-*a*, the mapping between each bit and a corresponding feedback process identifier may be determined (e.g., implicitly) by the order of the bit in the corresponding bitmap (e.g., 1st bit may map to a feedback process identifier with value 0) or the mapping be explicitly signaled.

In some examples, the selected feedback process identifiers may be indicated via one or more lists or ranges of feedback process identifiers. The lists or the ranges of feedback process identifiers may be per CC configured at UE 115-*a* (e.g., there may be a list or range for each configured CC). For instance, each feedback process identifier in the CC-specific list or range may indicate that UE 115-*a* is to provide feedback for the CC for the corresponding feedback process identifier. Additionally or alternatively, the lists or the ranges of feedback process identifiers may be common to each CC configured at UE 115-*a* (e.g., there may be a single list or range for multiple CCs). For instance, each feedback process identifier in the common list or range may indicate that UE 115-*a* is to provide feedback for each CC configured with that feedback process identifier. If the selected feedback process identifiers are indicated via a range, the range may be signaled with a starting feedback process identifier and a number of continuous identifiers (e.g., a number of feedback process identifiers relative to the starting feedback process identifier that are each next to each other in an order, where at least one of the feedback process identifiers is next to the starting feedback process identifier). Alternatively, the range may be signaled with a pair of starting and ending feedback process identifiers.

For the construction of a feedback process identifier specific codebook (e.g., an enhanced Type3 codebook), UE 115-*a* may concatenate feedback (e.g., A/N bits) corresponding to selected feedback process identifiers for a first CC, and may then concatenate feedback (e.g., A/N bits) corresponding to selected feedback process identifiers for a second CC. UE 115-*a* may continue to perform this process for each CC for which UE 115-*a* is to provide feedback. Each feedback process identifier may correspond to multiple feedback bits (e.g., multiple A/N bits) for multiple transport blocks and/or multiple code block groups per transport block.

An enhanced Type3 codebook may be indicated by DCI scheduling downlink or uplink traffic, DCI without a scheduled transmission, or DCI in a dedicated format. For DCI scheduling downlink traffic, UE 115-*a* may use control message 220 to determine whether UE 115-*a* is to use a Type1 codebook, a Type2 codebook, a regular Type3 codebook, or an enhanced Type3 codebook to generate the feedback. A Type1 codebook may be a codebook that is semi-statically configured (e.g., associated with a semi-static condition), whereas a Type2 codebook may be a codebook that is dynamically configured (e.g., associate with a dynamic condition). In some examples, UE 115-a may determine a Type1 codebook according to a predefined table stored at UE 115-a, whereas UE 115-a may determine a Type2 codebook based on a channel state information (CSI) report. A Type3 codebook may be used when UE 115-a is providing one-shot feedback (e.g., feedback in response to one-shot data transmissions). A regular Type3 codebook may differ from an enhanced Type3 codebook in that the regular Type3 codebook may include feedback for each feedback process identifier for each CC, whereas an enhanced Type3 codebook may include feedback for feedback process identifiers indicated by a control message 220. The DCI may use 1 bit to indicate whether a codebook is a Type1 or Type2 codebook (e.g., a regular Type1 or Type2 codebook) or is a regular or enhanced Type3 codebook (e.g., whichever is enabled). If both regular and enhanced Type3 codebooks are enabled for dynamic selection, the DCI may include 2 bits to indicate whether the codebook is a Type1 or Type 2 codebook, a regular Type3 codebook, or an enhanced Type3 codebook.

In some examples, performing the methods described herein may be associated with one or more advantages. For instance, an enhanced Type3 codebook may convey feedback for fewer feedback process identifiers than a regular Type3 codebook. Accordingly, an enhanced Type3 codebook may be associated with a lower feedback data overhead and/or a reduced resource utilization as compared to a regular Type3 codebook. Having a lower feedback data overhead and/or a reduced resource utilization may improve the efficiency of communications.

Figure 3:
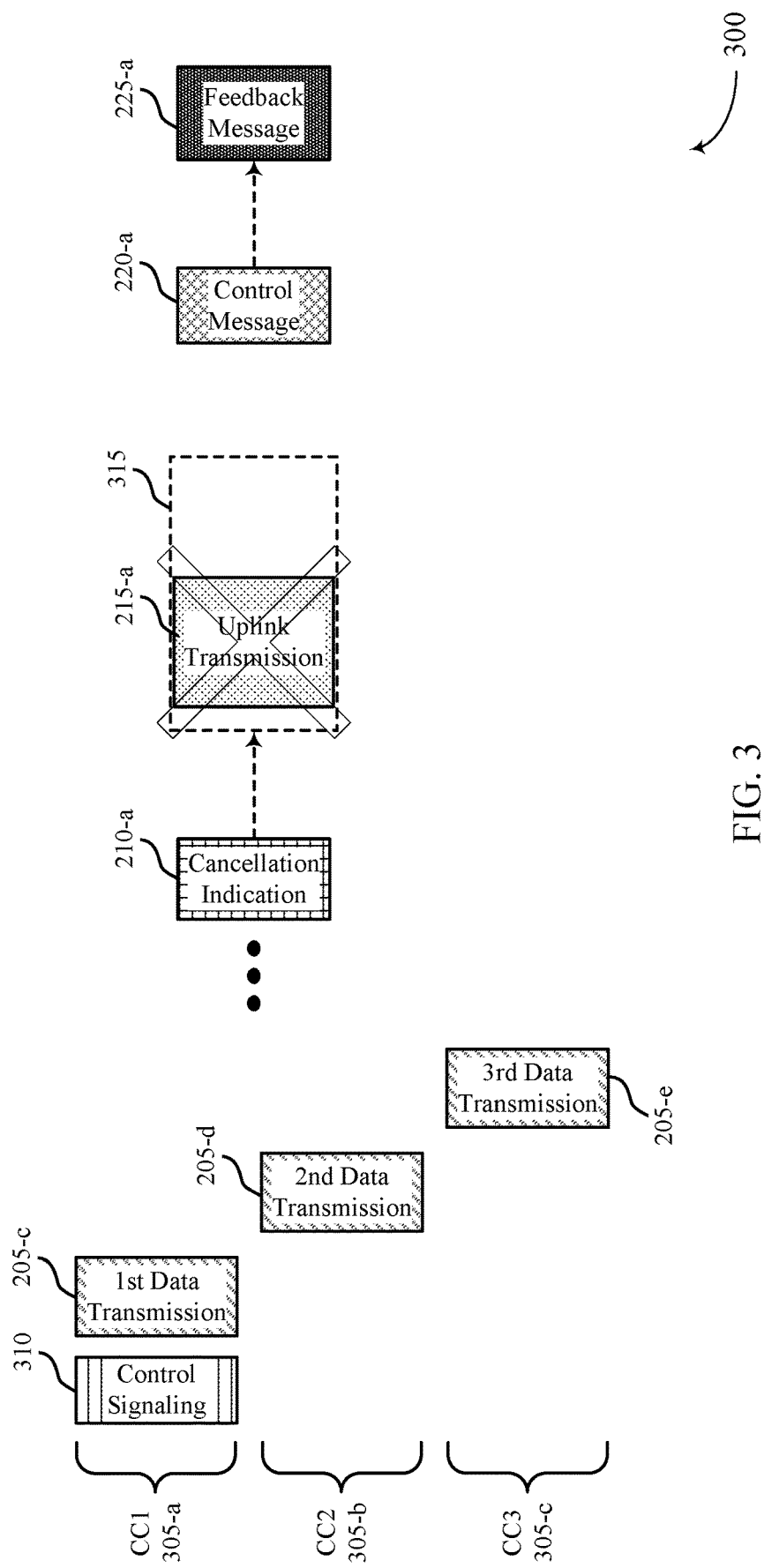
FIG. 3 illustrates an example of a communications scheme that supports feedback based on indicated feedback process identifiers in accordance with aspects of the present disclosure.

FIG. 3 illustrates an example of a communications scheme 300 that supports feedback based on indicated feedback process identifiers in accordance with aspects of the present disclosure. In some examples, communications scheme 300 may be implemented by one or more aspects of wireless communications systems 100 and/or 200. For instance, communications scheme 300 may represent communications that occur between UE 115 and network entity 105, or a UE 115-a and network entity 105-a. Additionally or alternatively, first data transmission 205-c, second data transmission 205-d, and third data transmission 205-e may be examples of a data transmission 205-a or 205-b as described with reference to FIG. 2; cancellation indication 210-a may be an example of a cancellation indication as described with reference to FIG. 2; uplink transmission 215-a may be an example of an uplink transmission 215 as described with reference to FIG. 2; control message 220-a may be an example of a control message 220 as described with reference to FIG. 2; and feedback message 225-a may be an example of a feedback message 225 as described with reference to FIG. 2.

A network entity 105 may communicate with a UE 115. For instance, the network entity 105 may transmit control signaling 310 to the UE 115 that schedules the UE 115 with one or more data transmissions. For instance, in the present example, control signaling 310 may schedule the UE 115 with first data transmission 205-c, second data transmission 205-d, and third data transmission 205-e. In some examples, one or more of first data transmission 205-c, second data transmission 205-d, and third data transmission 205-e may be scheduled via a separate instance of control signaling 310. In some examples, one or more of first data transmission 205-c, second data transmission 205-d, and third data transmission 205-e may be communicated over different CCs. For instance, first data transmission 205-c may be communicated over CC 305-a (e.g., CC1), second data transmission 205-d may be communicated over CC 305-b (e.g., CC2), and third data transmission 205-e may be communicated over CC 305-c (e.g., CC3). In some examples, control signaling 310 may be communicated over a same CC as one or more of the scheduled data transmissions. For instance, control signaling 310 may be communicated over CC 305-a. In some examples, the data transmissions may be included in respective PDSCH transmissions.

In some examples, the network entity 105 may schedule an uplink transmission 215-a (e.g., PDSCH transmission) at the UE 115 (e.g., via a physical downlink control channel (PDCCH) transmission) that the UE 115 may use to provide feedback for a feedback process identifier (e.g., HARQ process identifier) associated with each of the one or more data transmissions. For instance, the UE 115 may use the uplink transmission 215-a to communicate first feedback data associated with first data transmission 205-c, second feedback data associated with second data transmission 205-e, and third feedback data associated with third data transmission 205-e.

In some examples, the network entity 105 may transmit a cancellation indication 210-a to the UE 115 that cancels the scheduled uplink transmission 215-a. The cancellation indication may, for instance, be included in a downlink control channel transmission (e.g., DCI). In some examples, scheduled uplink transmission 215-a may be included within a cancellation window 315. In some examples, cancellation indication 210-a may indicate the cancellation window 315. Cancellation window 315 may correspond to a window of time over which one or more transmissions (e.g., uplink transmission 215-a) are cancelled.

In order to enable the UE 115 to transmit the feedback after the UE 115 receives the cancellation indication 210-a, the network entity 105 may transmit a control message 220-a to the UE 115 instructing the UE 115 to generate a feedback message 225-a using a Type3 codebook. In some examples, the control message may include an indication of a subset of the set of feedback process identifiers which the UE 115 is to include feedback for in the feedback message. For instance, in the present example, the control message 220-a may indicate that feedback message 225-a is to include feedback data for a first feedback process identifier associated with first data transmission 205-c, a second feedback process identifier associated with second data transmission 205-d, and a third feedback process identifier associated with third data transmission 205-e. The network entity 105 may thereby request that the UE 115 provides feedback on the same feedback process identifiers that the UE 115 was scheduled to provide in the cancelled uplink transmission. In some examples, the feedback message 225-a may be included in a physical uplink control channel (PUCCH) transmission. In some examples, a first resource scheduled for transmitting uplink transmission 215-a may be different than a second resource over which feedback message 225-a is transmitted (e.g., based on receiving control message 220-a and/or cancellation indication 210-a).

In some examples, the network entity 105 may indicate the subset in the control message 220-a using a bitmap. For instance, the control message 220-a may include a set of bitmaps that respectively correspond to a set of CCs. In the present example, a first bitmap of control message 220-a may correspond to CC 305-a, a second bitmap of control message 220-a may correspond to CC 305-b, and a third bitmap of control message 220-a may correspond to CC 305-c. Accordingly, to indicate that feedback data is to be conveyed for first data transmission 205-c, second data transmission 205-d, and third data transmission 205-e, a bit of the first bitmap that corresponds to a first feedback process identifier of first data transmission 205-c may have a first value (e.g., 1), a bit of the second bitmap that corresponds to a second feedback process identifier of second data transmission 205-d may have the first value, and a bit of the third bitmap that corresponds to a third feedback process identifier of third data transmission 205-e may have the first value.

In some examples, the control message 220-a may include a single bitmap for (e.g., common to) multiple CCs. In some examples, each bit of the bitmap may correspond to a feedback process identifier for each CC in which the feedback process identifier is configured. For instance, if a first feedback process identifier is configured for CCs 305-a and 305-b and the bitmap indicates the first feedback process identifier, feedback message 225-a may convey feedback for the first feedback process identifier for CCs 305-a and 305-b. In some examples, each bit in the bitmap may correspond to a respective feedback process identifier of a set of feedback process identifiers, where each feedback process identifier corresponding to a bit in the bitmap is in a same position of a respective order relative to a respective component carrier. For instance, if CC 305-a is associated with I configured feedback process identifiers (e.g., where I is an integer quantity of feedback process identifiers), CC 305-b is associated with J configured feedback process identifiers (e.g., where J is an integer quantity of feedback process identifiers), and CC 305-c is associated with K configured feedback process identifiers (e.g., where K is an integer quantity of feedback process identifiers), and an xth bit of the bitmap has a first value, then feedback message 225-a may include feedback data for a feedback process identifier for CC 305-a if x≤I, feedback data for a feedback process identifier for CC 305-b if x≤J, and feedback data for a feedback process identifier for CC 305-c if x≤K. The feedback process identifier included for each CC may depend on an order of the configured feedback process identifiers for each CC. For instance, if the xth bit has the first value and assuming x≤I, x≤J, and x≤K, then the feedback message 225-a may include feedback data for the xth feedback process identifier of CC 305-a, the xth feedback process identifier of CC 305-b, and the xth feedback process identifier of CC 305-c. In some examples, the feedback message may include a bitmap where a first bit of the bitmap corresponds to a feedback process identifier for a first CC (e.g., CC 305-a) and a second bit of bitmap corresponds to a second feedback process identifier for a second CC (e.g., CC 305-b). In some such examples, the feedback message including the feedback data for the first CC may be transmitted if the first bit has a first value (e.g., 1), for the second CC if the second bit has the first value (e.g., 1), or both. Including a single bitmap for multiple CCs may, as a UE 115 may be associated with reduced overhead as compared to multiple bitmaps for multiple CCs.

In some examples, the network entity 105 may indicate a list or range of feedback process identifiers in the control message 220-a. For instance, the network entity 105 may include a set of lists or ranges that respectively correspond to a set of CCs. In the present example, a first list or range of control message 220-a may correspond to CC 305-a, a second list or range of control message 220-a may correspond to CC 305-b, and a third list or range of control message 220-a may correspond to CC 305-c. Accordingly, to indicate that feedback data is to be conveyed for first data transmission 205-c, second data transmission 205-d, and third data transmission 205-e, the first list or range may indicate a first feedback process identifier of first data transmission 205-c, the second list or range may indicate a second feedback process identifier of second data transmission 205-d, and a third list or range may indicate a third feedback process identifier of third data transmission 205-e.

In some examples, the control message 220-a may include a list or range common to each CC. For instance, each feedback process identifier indicated by the list or range may indicate that the feedback message 225-a is to include feedback data for each CC in which the feedback process identifier is configured. For instance, if a first feedback process identifier is configured for CCs 305-a and 305-b and the list or the range indicates the first feedback process identifier, feedback message 225-a may convey feedback for the first feedback process identifier for CCs 305-a and 305-b.

In some examples, the feedback message 225-a may include first feedback bits corresponding to a first feedback process identifier concatenated with second feedback bits corresponding to a second feedback process identifier. In some such examples, the first feedback process identifier may be associated with a first CC and the second feedback process identifier may be associated with a second CC. In some examples, the feedback message 225-a may include feedback bits corresponding to one or more feedback process identifiers of the first CC concatenated with feedback bits corresponding to one or more feedback process identifiers of the second CC.

In some examples, the control message 220-a may include an indication of a type of feedback codebook, where the feedback data is generated in accordance with the indicated type of feedback codebook. For instance, control message 220-a may indicate that the feedback data is to be generated in accordance with a first type of feedback codebook (e.g., Type1 or Type2 codebook) or a second type of feedback codebook (e.g., Type3 codebook). Additionally or alternatively, control message 220-a may indicate that the feedback data is to be generated in accordance with a first type of feedback (e.g., Type1 or Type2 codebook), a second type of feedback codebook (e.g., regular Type3 codebook), or a third type of feedback codebook (e.g., enhanced Type3 codebook).

Figure 4:
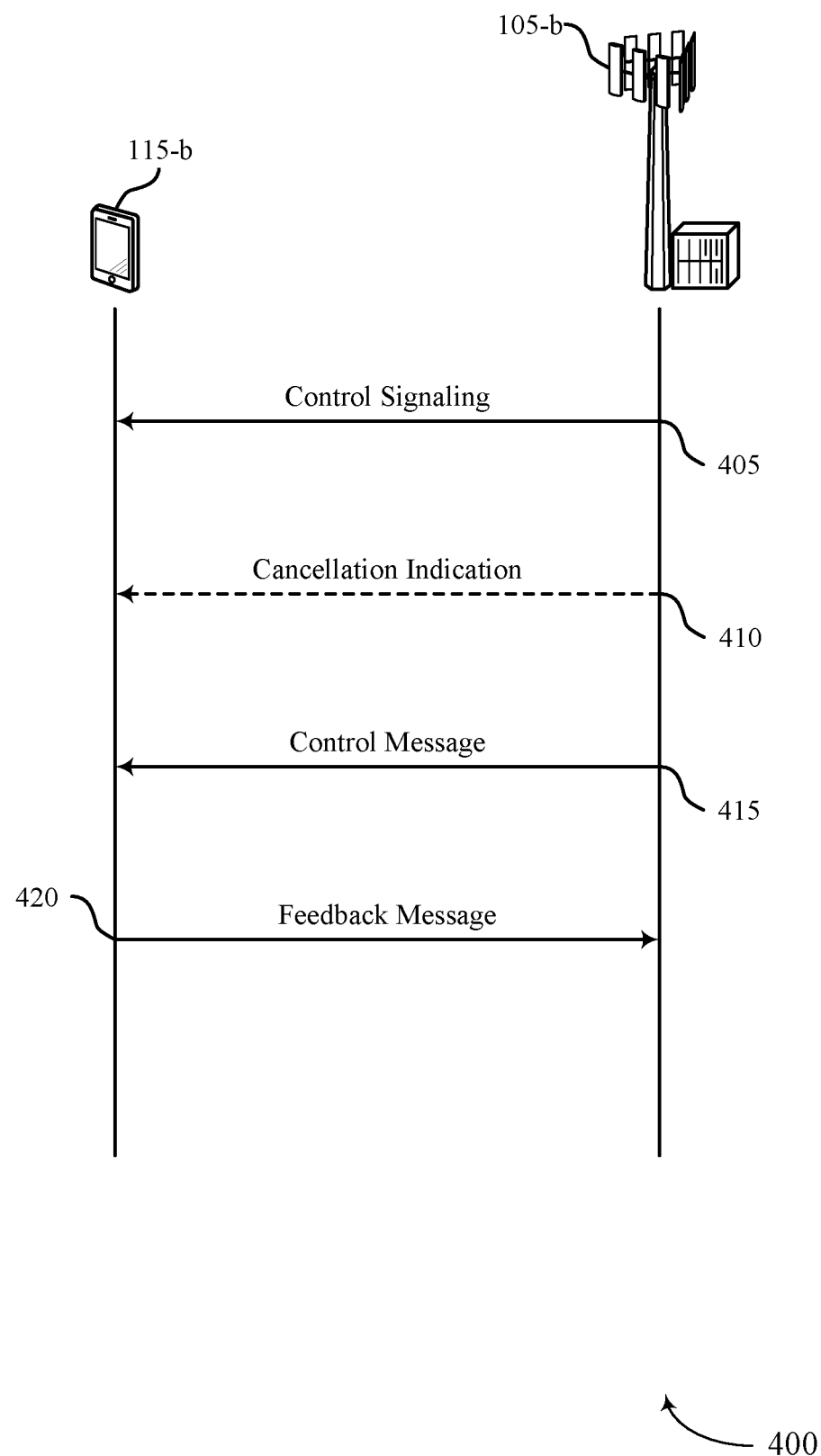
FIG. 4 illustrates an example of a process flow that supports feedback based on indicated feedback process identifiers in accordance with aspects of the present disclosure.

FIG. 4 illustrates an example of a process flow 400 that supports feedback based on indicated feedback process identifiers in accordance with aspects of the present disclosure. In some examples, process flow 400 may be implemented by one or more aspects of wireless communications systems 100 and/or 200. For instance, UE 115-b may be an example of a UE 115-a as described with reference to FIG. 2 and/or a UE 115 as described with reference to FIG. 1. Additionally or alternatively, network entity 105-b may be an example of a network entity 105-a as described with reference to FIG. 2 and/or a network entity 105 (e.g., a base station) as described with reference to FIG. 1.

At 405, network entity 105-b may transmit, to UE 115-b, control signaling (e.g., control signaling 310 as described with reference to FIG. 3) indicating that UE 115-b is to provide feedback corresponding to a set of feedback process identifiers for at least one component carrier.

At 410, network entity 105-b may transmit, to UE 115-b, a cancellation indication (e.g., cancellation indication 210 as described with reference to FIG. 2 and/or cancellation indication 210-a as described with reference to FIG. 3) that cancels a scheduled uplink transmission (e.g., uplink transmission 215 as described with reference to FIG. 2 and/or uplink transmission 215-a as described with reference to FIG. 3) in which UE 115-*b* is scheduled to provide feedback data corresponding to a subset of the set of feedback process identifiers (e.g., where the subset corresponds to feedback process identifiers for data transmissions 205-*a* and 205-*b* as described with reference to FIG. 2 and/or for data transmissions 205-*c*, 205-*d*, and 205-*e* as described with reference to FIG. 3). In some examples, a DCI includes the cancellation indication.

At 415, network entity 105-*b* may transmit, to UE 115-*b*, a control message (e.g., a control message 220 as described with reference to FIG. 2 and/or a control message 220-*a* as described with reference to FIG. 3) scheduling UE 115-*b* to transmit the feedback data corresponding to the subset of the set of feedback process identifiers (e.g., based on the cancellation indication). In some examples, the subset of the set of feedback process identifiers may exclude at least one feedback process identifier of the set of feedback process identifiers. In some examples, the control message may include a bitmap indicating a first feedback process identifier of the subset of the set of feedback process identifiers. In some examples, the control message may include a set of bitmaps that respectively correspond to a set of component carriers (e.g., CCs 305-*a*, 305-*b*, and 305-*c* as described with reference to FIG. 3). In some examples, the control message may include a bitmap, where a first bit of the bitmap corresponds to a first feedback process identifier for each component carrier of a set of component carriers in which the first feedback process identifier is configured. In some examples, the control message may include a bitmap, where each bit in the bitmap corresponds to a respective feedback process identifier of the plurality of feedback process identifiers, where each feedback process identifier corresponding to a bit in the bitmap is in a same position of a respective order relative to a respective component carrier. In some examples, the control message includes a bitmap, where a first bit of the bitmap corresponds to a first feedback process identifier for a first component carrier and a second bit of the bitmap corresponds to a second feedback process identifier for a second component carrier. In some examples, a first resource scheduled by the control signaling for transmitting the uplink transmission may be different than a second resource over which the feedback message is transmitted (e.g., based on receiving the control message and/or the cancellation indication).

In some examples, the control message may include a list or a range indicating the subset of the set of feedback process identifiers corresponding to a single component carrier or that is common to a set of component carriers. In some examples, the control message includes an indication of a type of feedback codebook, where the feedback data is generated in accordance with the indicated type of the feedback codebook. In some examples, DCI, MAC-CE signaling, or RRC signaling includes the control message.

At 420, UE 115-*b* may transmit, to network entity 105-*b*, a feedback message including the feedback data for the subset of the set of feedback process identifiers based on the control message. In some examples, the feedback message may include the feedback data for each component carrier of the set of component carriers in which the first feedback process identifier is configured based on the first bit having a first value. In some examples, the feedback message may include the feedback data for the first component carrier based on the first bit having a first value, for the second component carrier based on the second bit having the first value, or both. In some examples, the feedback message may include first feedback bits corresponding to a first feedback process identifier concatenated with second feedback bits corresponding to a second feedback process identifier. In some examples, an uplink control channel transmission includes the feedback message.

Figure 5:
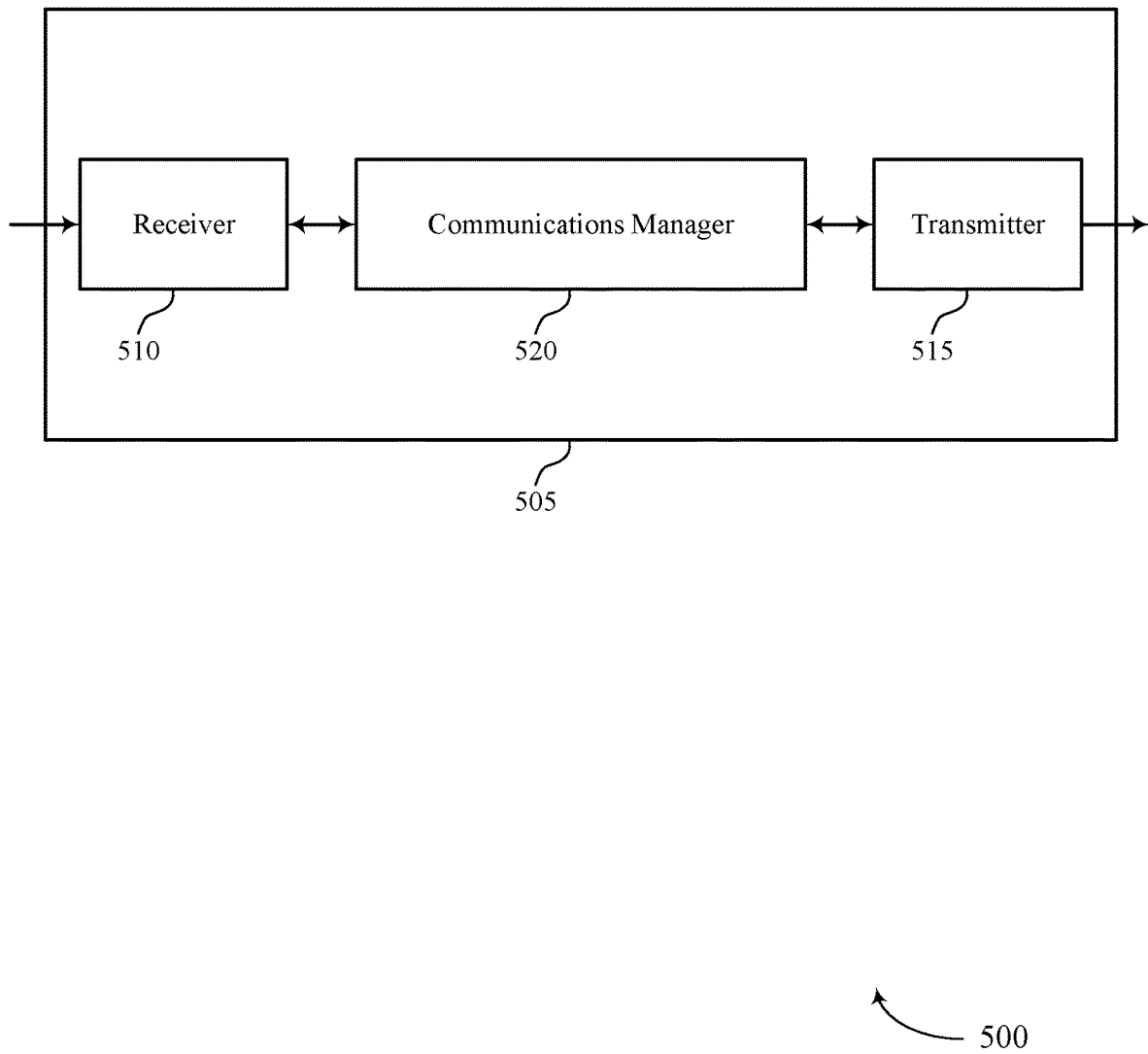
FIGS. 5 and 6 show block diagrams of devices that support feedback based on indicated feedback process identifiers in accordance with aspects of the present disclosure.

FIG. 5 shows a block diagram 500 of a device 505 that supports feedback based on indicated feedback process identifiers in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback based on indicated feedback process identifiers). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback based on indicated feedback process identifiers). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of feedback based on indicated feedback process identifiers as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with or to the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a network entity, control signaling indicating that the UE is to provide feedback corresponding to a set of multiple feedback process identifiers for at least one component carrier. The communications manager 520 may be configured as or otherwise support a means for receiving, from the network entity, a cancellation indication that cancels a scheduled uplink transmission in which the UE is scheduled to provide feedback data corresponding to a subset of the set of multiple feedback process identifiers. The communications manager 520 may be configured as or otherwise support a means for receiving, from the network entity, a control message scheduling the UE to transmit the feedback data corresponding to the subset of the set of multiple feedback process identifiers (e.g., based on the cancellation indication). The communications manager 520 may be configured as or otherwise support a means for transmitting, to the network entity, a feedback message including the feedback data for the subset of the set of multiple feedback process identifiers based on the control message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for the communications manager 520 to transmit feedback that was scheduled to be provided by an uplink transmission that was subsequently canceled by a cancellation indication. Additionally, the device 505 may support techniques for the communications manager 520 to transmit the feedback message with reduced overhead as compared to providing feedback for each feedback process identifier of each component carrier.

Figure 6:
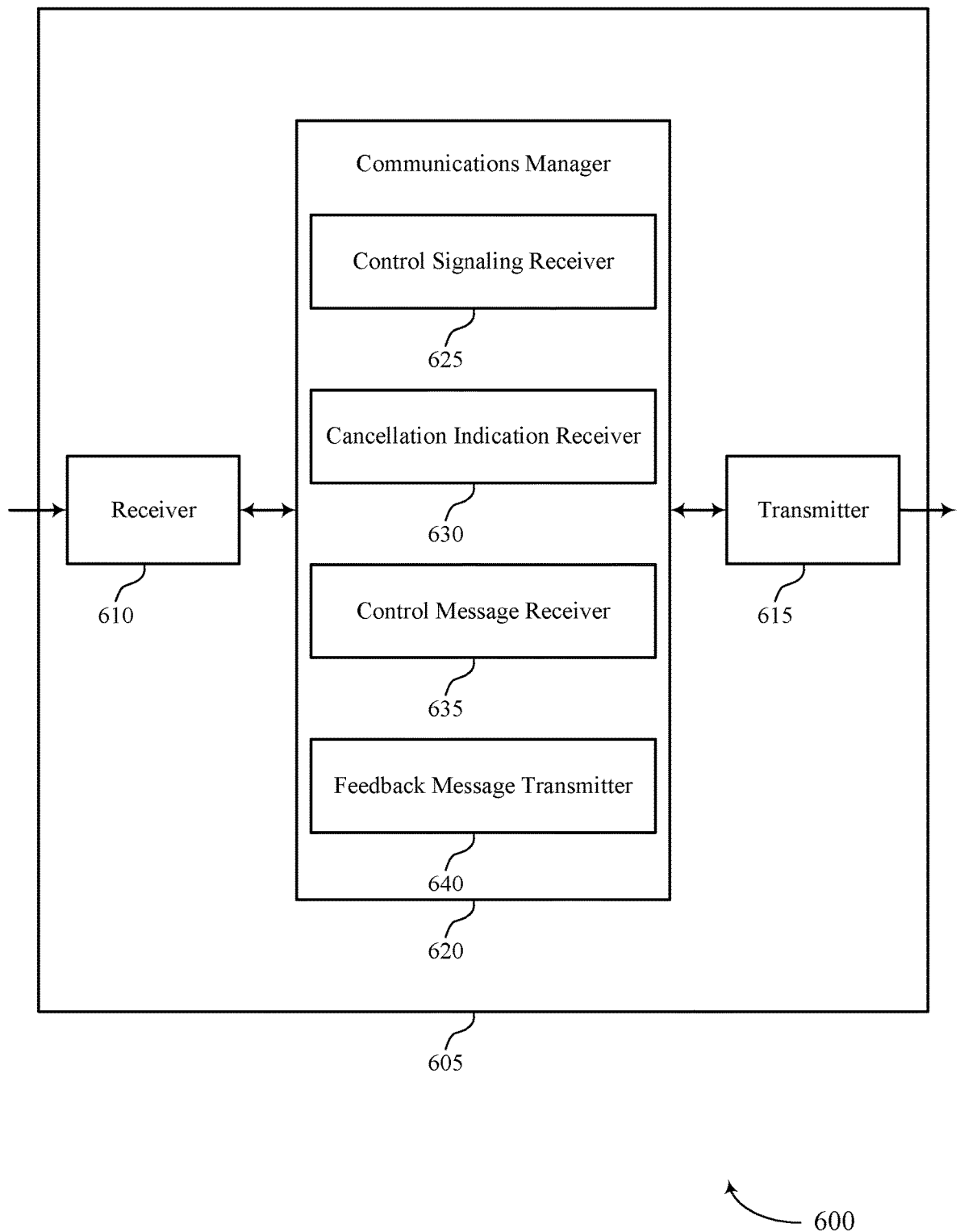

FIG. 6 shows a block diagram 600 of a device 605 that supports feedback based on indicated feedback process identifiers in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback based on indicated feedback process identifiers). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback based on indicated feedback process identifiers). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of feedback based on indicated feedback process identifiers as described herein. For example, the communications manager 620 may include a control signaling receiver 625, a cancellation indication receiver 630, a control message receiver 635, a feedback message transmitter 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control signaling receiver 625 may be configured as or otherwise support a means for receiving, from a network entity, control signaling indicating that the UE is to provide feedback corresponding to a set of multiple feedback process identifiers for at least one component carrier. The cancellation indication receiver 630 may be configured as or otherwise support a means for receiving, from the network entity, a cancellation indication that cancels a scheduled uplink transmission in which the UE is scheduled to provide feedback data corresponding to a subset of the set of multiple feedback process identifiers. The control message receiver 635 may be configured as or otherwise support a means for receiving, from the network entity, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The feedback message transmitter 640 may be configured as or otherwise support a means for transmitting, to the network entity, a feedback message including the feedback data for the subset of the set of multiple feedback process identifiers based on the control message.

Figure 7:
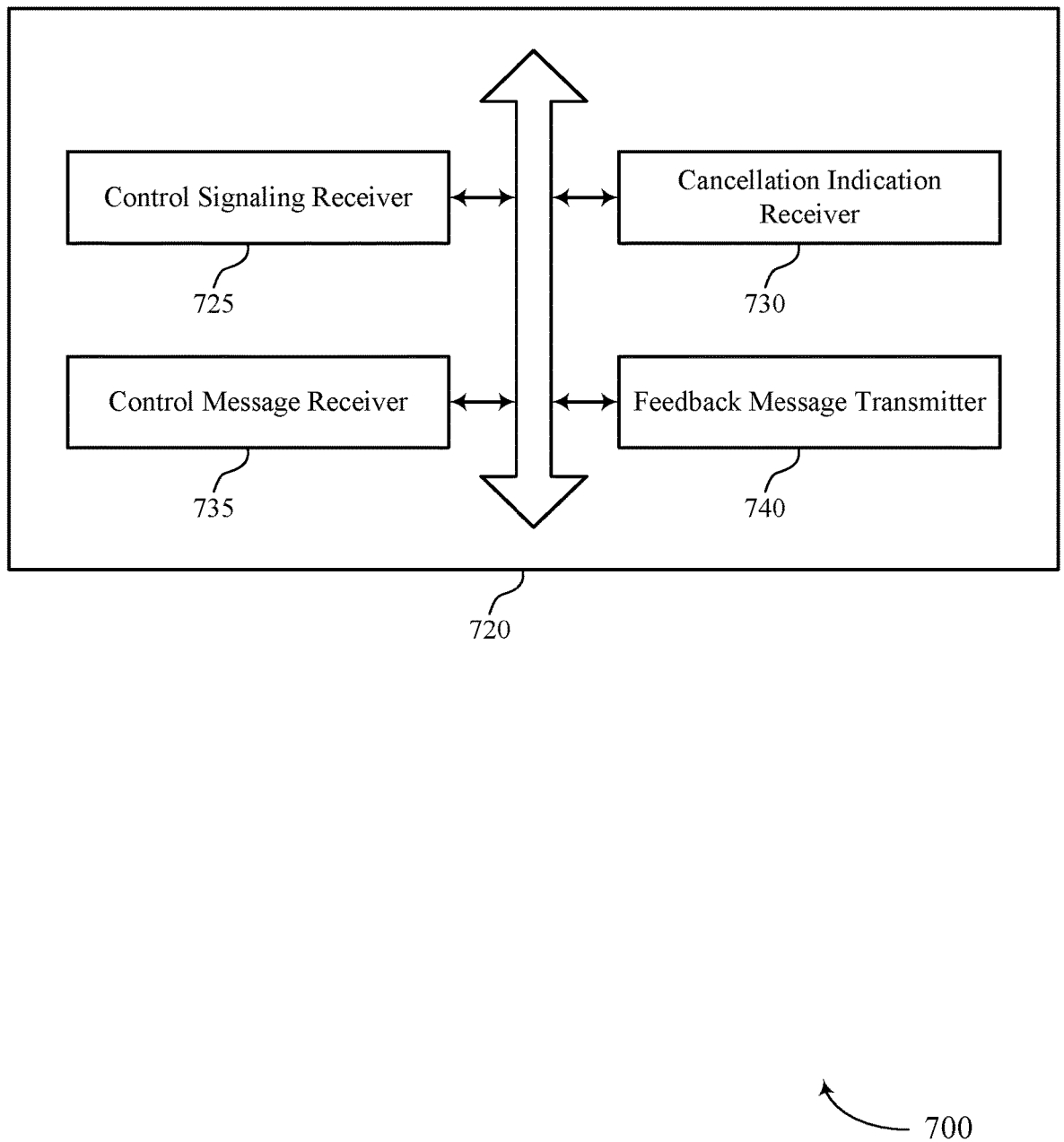
FIG. 7 shows a block diagram of a communications manager that supports feedback based on indicated feedback process identifiers in accordance with aspects of the present disclosure.

FIG. 7 shows a block diagram 700 of a communications manager 720 that supports feedback based on indicated feedback process identifiers in accordance with aspects of the present disclosure. The communications manager 720 may be an example of aspects of a communications manager 520, a communications manager 620, or both, as described herein. The communications manager 720, or various components thereof, may be an example of means for performing various aspects of feedback based on indicated feedback process identifiers as described herein. For example, the communications manager 720 may include a control signaling receiver 725, a cancellation indication receiver 730, a control message receiver 735, a feedback message transmitter 740, or any combination thereof. Each of these components may communicate, directly or indirectly, with one another (e.g., via one or more buses).

The communications manager 720 may support wireless communication at a UE in accordance with examples as disclosed herein. The control signaling receiver 725 may be configured as or otherwise support a means for receiving, from a network entity, control signaling indicating that the UE is to provide feedback corresponding to a set of multiple feedback process identifiers for at least one component carrier. The cancellation indication receiver 730 may be configured as or otherwise support a means for receiving, from the network entity, a cancellation indication that cancels a scheduled uplink transmission in which the UE is scheduled to provide feedback data corresponding to a subset of the set of multiple feedback process identifiers. The control message receiver 735 may be configured as or otherwise support a means for receiving, from the network entity, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The feedback message transmitter 740 may be configured as or otherwise support a means for transmitting, to the network entity, a feedback message including the feedback data for the subset of the set of multiple feedback process identifiers based on the control message.

In some examples, to support receiving the control message, the control message receiver 735 may be configured as or otherwise support a means for receiving the control message including a bitmap indicating a first feedback process identifier of the subset of the set of multiple feedback process identifiers.

In some examples, to support receiving the control message, the control message receiver 735 may be configured as or otherwise support a means for receiving the control message including a set of multiple bitmaps that respectively correspond to a set of multiple component carriers.

In some examples, to support receiving the control message, the control message receiver 735 may be configured as or otherwise support a means for receiving the control message including a bitmap, where a first bit of the bitmap corresponds to a first feedback process identifier for each component carrier of a set of multiple component carriers in which the first feedback process identifier is configured.

In some examples, to support transmitting the feedback message, the feedback message transmitter 740 may be configured as or otherwise support a means for transmitting the feedback message including the feedback data for each component carrier of the set of multiple component carriers in which the first feedback process identifier is configured based on the first bit having a first value.

In some examples, to support receiving the control message, the control message receiver 735 may be configured as or otherwise support a means for receiving the control message including a bitmap, where each bit in the bitmap corresponds to a respective feedback process identifier of the plurality of feedback process identifiers, where each feedback process identifier corresponding to a bit in the bitmap is in a same position of a respective order relative to a respective component carrier.

In some examples, to support receiving the control message, the control message receiver 735 may be configured as or otherwise support a means for receiving the control message including a bitmap, where a first bit of the bitmap corresponds to a first feedback process identifier for a first component carrier and a second bit of the bitmap corresponds to a second feedback process identifier for a second component carrier.

In some examples, to support transmitting the feedback message, the feedback message transmitter 740 may be configured as or otherwise support a means for transmitting the feedback message including the feedback data for the first component carrier based on the first bit having a first value, for the second component carrier based on the second bit having the first value, or both.

In some examples, to support receiving the control message, the control message receiver 735 may be configured as or otherwise support a means for receiving the control message including a list or a range indicating the subset of the set of multiple feedback process identifiers corresponding to a single component carrier or that is common to a set of multiple component carriers.

In some examples, to support transmitting the feedback message, the feedback message transmitter 740 may be configured as or otherwise support a means for transmitting the feedback message including first feedback bits corresponding to a first feedback process identifier concatenated with second feedback bits corresponding to a second feedback process identifier.

In some examples, to support receiving the control message, the control message receiver 735 may be configured as or otherwise support a means for receiving the control message including an indication of a type of feedback codebook, where the feedback data is generated in accordance with the indicated type of the feedback codebook.

In some examples, to support receiving the control message, the control message receiver 735 may be configured as or otherwise support a means for receiving downlink control information including the control message, medium access control (MAC) control element signaling including the control message, or radio resource control signaling including the control message.

In some examples, to support receiving the cancellation indication, the cancellation indication receiver 730 may be configured as or otherwise support a means for receiving downlink control information including the cancellation indication.

In some examples, to support transmitting the feedback message, the feedback message transmitter 740 may be configured as or otherwise support a means for transmitting an uplink control channel transmission including the feedback message.

Figure 8:
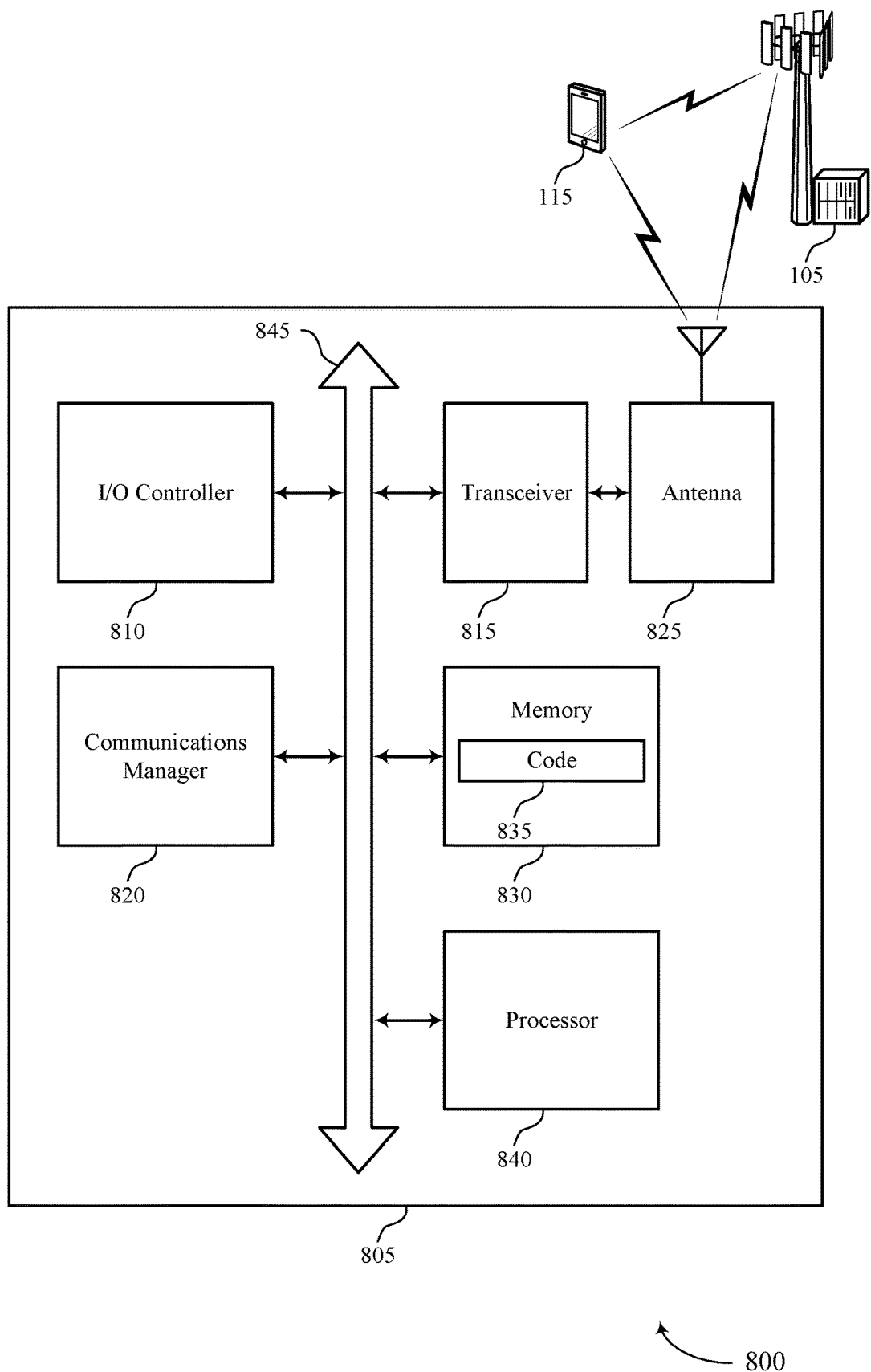
FIG. 8 shows a diagram of a system including a device that supports feedback based on indicated feedback process identifiers in accordance with aspects of the present disclosure.

FIG. 8 shows a diagram of a system 800 including a device 805 that supports feedback based on indicated feedback process identifiers in accordance with aspects of the present disclosure. The device 805 may be an example of or include the components of a device 505, a device 605, or a UE 115 as described herein. The device 805 may communicate wirelessly with one or more network entities 105 (e.g., base stations), UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a graphics processing unit (GPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback based on indicated feedback process identifiers). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity, control signaling indicating that the UE is to provide feedback corresponding to a set of multiple feedback process identifiers for at least one component carrier. The communications manager 820 may be configured as or otherwise support a means for receiving, from the network entity, a cancellation indication that cancels a scheduled uplink transmission in which the UE is scheduled to provide feedback data corresponding to a subset of the set of multiple feedback process identifiers. The communications manager 820 may be configured as or otherwise support a means for receiving, from the network entity, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The communications manager 820 may be configured as or otherwise support a means for transmitting, to the network entity, a feedback message including the feedback data for the subset of the set of multiple feedback process identifiers based on the control message.

By including or configuring the communications manager 820 in accordance with examples as described herein, the device 805 may support techniques for the communications manager 820 to transmit feedback that was scheduled to be provided by an uplink transmission that was subsequently canceled by a cancellation indication. Additionally, the device 805 may support techniques for the communications manager 820 to transmit the feedback message with reduced overhead as compared to providing feedback for each feedback process identifier of each component carrier.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of feedback based on indicated feedback process identifiers as described herein, or the processor 840 and the memory 830 may be otherwise configured to perform or support such operations.

Figure 9:
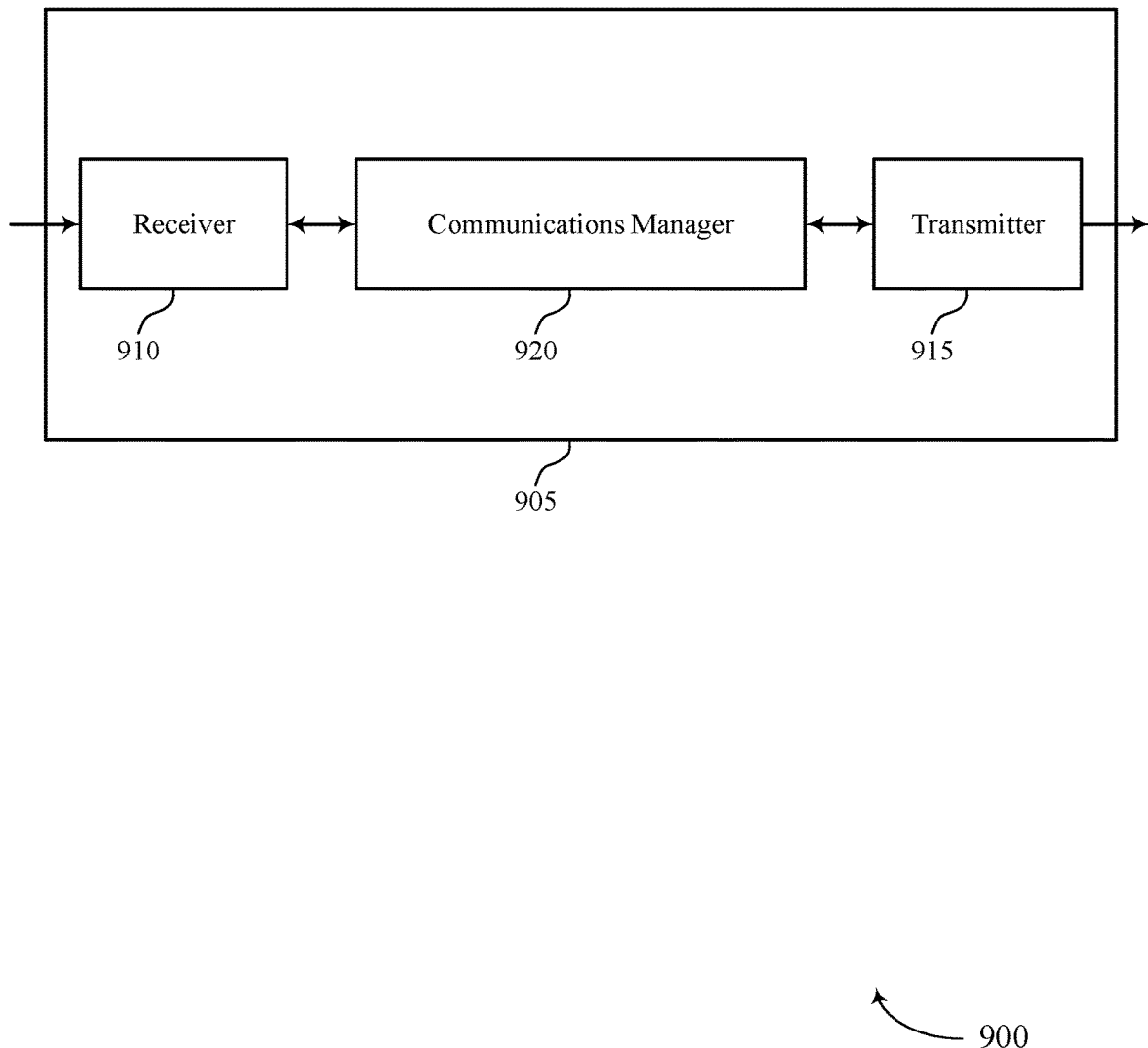
FIGS. 9 and 10 show block diagrams of devices that support feedback based on indicated feedback process identifiers in accordance with aspects of the present disclosure.

FIG. 9 shows a block diagram 900 of a device 905 that supports feedback based on indicated feedback process identifiers in accordance with aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to feedback based on indicated feedback process identifiers). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to feedback based on indicated feedback process identifiers). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of feedback based on indicated feedback process identifiers as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with or to the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network entity in accordance with examples as disclosed herein. For example, the communications manager 920 may be configured as or otherwise support a means for transmitting, to a UE, control signaling indicating that the UE is to provide feedback corresponding to a set of multiple feedback process identifiers for at least one component carrier. The communications manager 920 may be configured as or otherwise support a means for transmitting, to the UE, a cancellation indication indicating cancellation of a scheduled uplink transmission in which the UE is scheduled to provide feedback data corresponding to a subset of the set of multiple feedback process identifiers. The communications manager 920 may be configured as or otherwise support a means for transmitting, to the UE, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The communications manager 920 may be configured as or otherwise support a means for receiving, from the UE, a feedback message including the feedback data for the subset of the set of multiple feedback process identifiers based on the control message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for the communications manager 920 to receive feedback that was scheduled to be provided by an uplink transmission that was subsequently canceled by a cancellation indication. Additionally, the device 905 may support techniques for the communications manager 920 to receive the feedback message with reduced overhead as compared to receiving feedback for each feedback process identifier of each component carrier.

Figure 10:
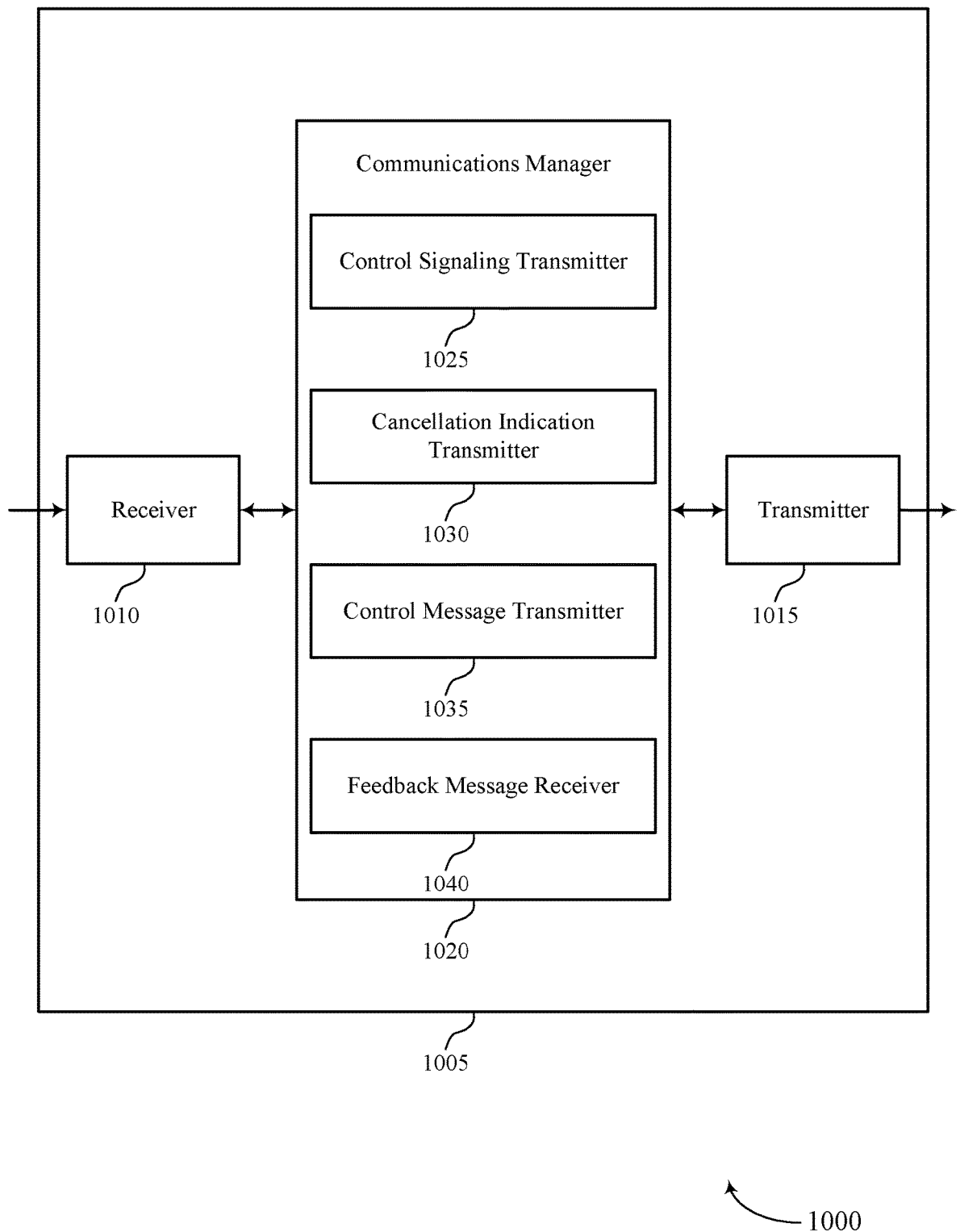

FIG. 10 shows a block diagram 1000 of a device 1005 that supports feedback based on indicated feedback process identifiers in accordance with aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to feedback based on indicated feedback process identifiers). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to feedback based on indicated feedback process identifiers). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of feedback based on indicated feedback process identifiers as described herein. For example, the communications manager 1020 may include a control signaling transmitter 1025, a cancellation indication transmitter 1030, a control message transmitter 1035, a feedback message receiver 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network entity in accordance with examples as disclosed herein. The control signaling transmitter 1025 may be configured as or otherwise support a means for transmitting, to a UE, control signaling indicating that the UE is to provide feedback corresponding to a set of multiple feedback process identifiers for at least one component carrier. The cancellation indication transmitter 1030 may be configured as or otherwise support a means for transmitting, to the UE, a cancellation indication indicating cancellation of a scheduled uplink transmission in which the UE is scheduled to provide feedback data corresponding to a subset of the set of multiple feedback process identifiers. The control message transmitter 1035 may be configured as or otherwise support a means for transmitting, to the UE, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The feedback message receiver 1040 may be configured as or otherwise support a means for receiving, from the UE, a feedback message including the feedback data for the subset of the set of multiple feedback process identifiers based on the control message.

Figure 11:
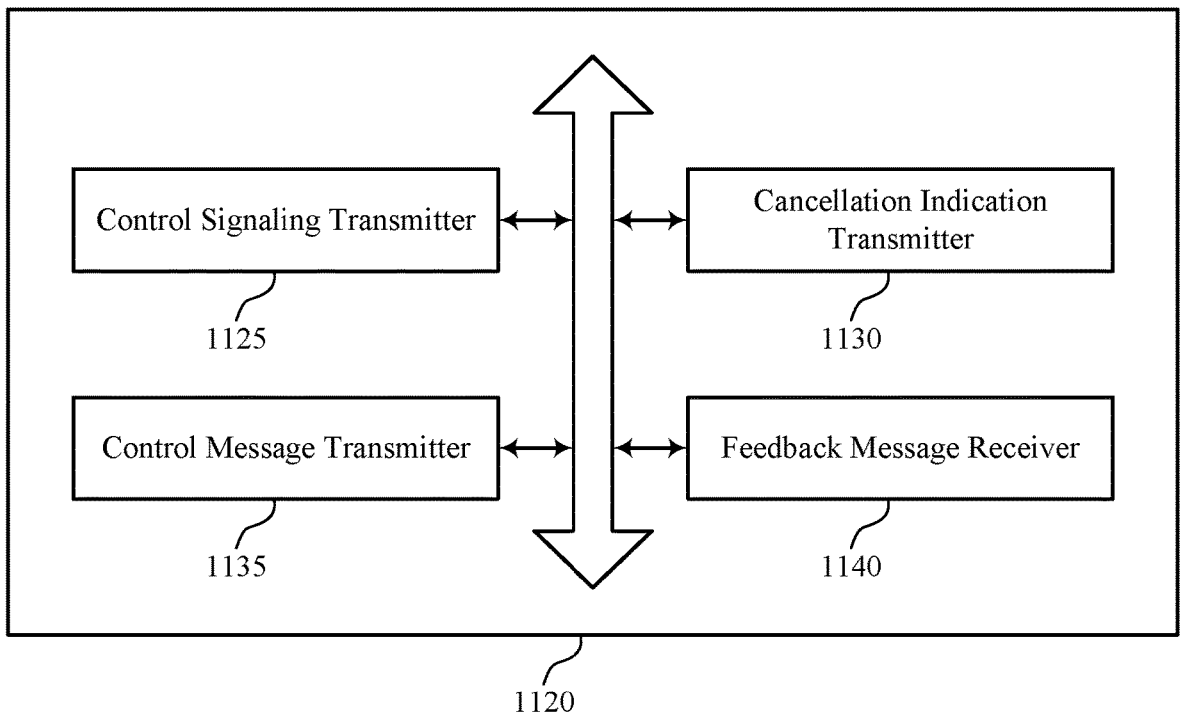
FIG. 11 shows a block diagram of a communications manager that supports feedback based on indicated feedback process identifiers in accordance with aspects of the present disclosure.

FIG. 11 shows a block diagram 1100 of a communications manager 1120 that supports feedback based on indicated feedback process identifiers in accordance with aspects of the present disclosure. The communications manager 1120 may be an example of aspects of a communications manager 920, a communications manager 1020, or both, as described herein. The communications manager 1120, or various components thereof, may be an example of means for performing various aspects of feedback based on indicated feedback process identifiers as described herein. For example, the communications manager 1120 may include a control signaling transmitter 1125, a cancellation indication transmitter 1130, a control message transmitter 1135, a feedback message receiver 1140, or any combination thereof. Each of these components may communicate, directly or indirectly, with one another (e.g., via one or more buses).

The communications manager 1120 may support wireless communication at a network entity in accordance with examples as disclosed herein. The control signaling transmitter 1125 may be configured as or otherwise support a means for transmitting, to a UE, control signaling indicating that the UE is to provide feedback corresponding to a set of multiple feedback process identifiers for at least one component carrier. The cancellation indication transmitter 1130 may be configured as or otherwise support a means for transmitting, to the UE, a cancellation indication indicating cancellation of a scheduled uplink transmission in which the UE is scheduled to provide feedback data corresponding to a subset of the set of multiple feedback process identifiers. The control message transmitter 1135 may be configured as or otherwise support a means for transmitting, to the UE, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The feedback message receiver 1140 may be configured as or otherwise support a means for receiving, from the UE, a feedback message including the feedback data for the subset of the set of multiple feedback process identifiers based on the control message.

In some examples, to support transmitting the control message, the control signaling transmitter 1125 may be configured as or otherwise support a means for transmitting the control message including a bitmap indicating a first feedback process identifier of the subset of the set of multiple feedback process identifiers.

In some examples, to support transmitting the control message, the control message transmitter 1135 may be configured as or otherwise support a means for transmitting the control message including a set of multiple bitmaps that respectively correspond to a set of multiple component carriers.

In some examples, to support transmitting the control message, the control message transmitter 1135 may be configured as or otherwise support a means for transmitting the control message including a bitmap, where a first bit of the bitmap corresponds to a first feedback process identifier for each component carrier of a set of multiple component carriers in which the first feedback process identifier is configured.

In some examples, to support receiving the feedback message, the feedback message receiver 1140 may be configured as or otherwise support a means for receiving the feedback message including the feedback data for each component carrier of the set of multiple component carriers in which the first feedback process identifier is configured based on the first bit having a first value.

In some examples, to support transmitting the control message, the control message transmitter 1135 may be configured as or otherwise support a means for transmitting the control message including a bitmap, where each bit in the bitmap corresponds to a respective feedback process identifier of the plurality of feedback process identifiers, where each feedback process identifier corresponding to a bit in the bitmap is in a same position of a respective order relative to a respective component carrier.

In some examples, to support transmitting the control message, the control message transmitter 1135 may be configured as or otherwise support a means for transmitting the control message including a bitmap, where a first bit of the bitmap corresponds to a first feedback process identifier for a first component carrier and a second bit of the bitmap corresponds to a second feedback process identifier for a second component carrier.

In some examples, to support receiving the feedback message, the feedback message receiver 1140 may be configured as or otherwise support a means for receiving the feedback message including the feedback data for the first component carrier based on the first bit having a first value, for the second component carrier based on the second bit having the first value, or both.

In some examples, to support transmitting the control message, the control message transmitter 1135 may be configured as or otherwise support a means for transmitting the control message including a list or a range indicating the subset of the set of multiple feedback process identifiers corresponding to a single component carrier or that is common to a set of multiple component carriers.

In some examples, to support receiving the feedback message, the feedback message receiver 1140 may be configured as or otherwise support a means for receiving the feedback message including first feedback bits corresponding to a first feedback process identifier concatenated with second feedback bits corresponding to a second feedback process identifier.

In some examples, to support transmitting the control message, the control message transmitter 1135 may be configured as or otherwise support a means for transmitting the control message including an indication of a type of feedback codebook, where the feedback data is associated with the indicated type of the feedback codebook.

In some examples, to support transmitting the control message, the control message transmitter 1135 may be configured as or otherwise support a means for transmitting downlink control information including the control message, medium access control (MAC) control element signaling including the control message, or radio resource control signaling including the control message.

In some examples, to support transmitting the cancellation indication, the cancellation indication transmitter 1130 may be configured as or otherwise support a means for transmitting downlink control information including the cancellation indication.

In some examples, to support receiving the feedback message, the feedback message receiver 1140 may be configured as or otherwise support a means for receiving an uplink control channel transmission including the feedback message.

Figure 12:
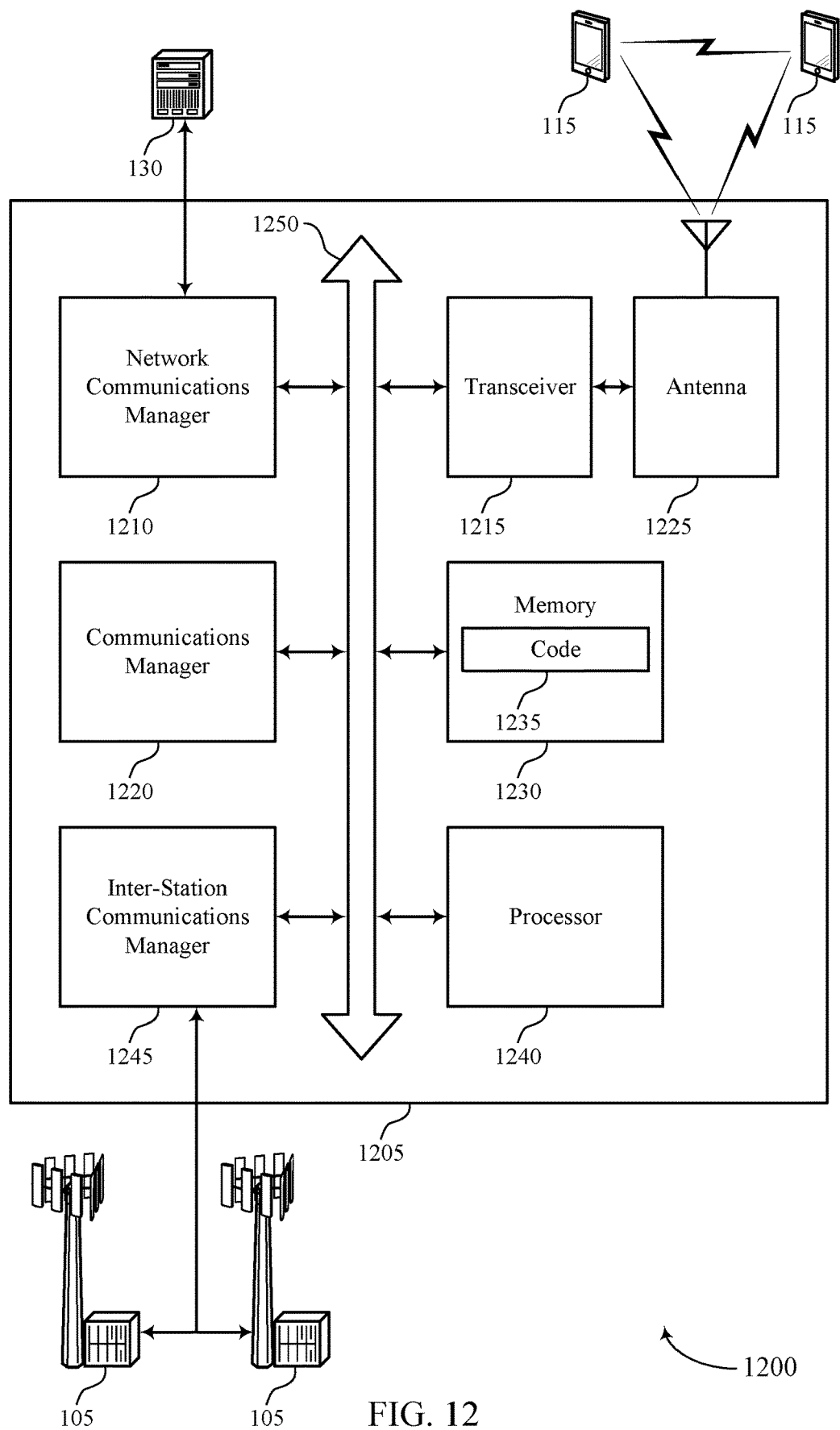
FIG. 12 shows a diagram of a system including a device that supports feedback based on indicated feedback process identifiers in accordance with aspects of the present disclosure.

FIG. 12 shows a diagram of a system 1200 including a device 1205 that supports feedback based on indicated feedback process identifiers in accordance with aspects of the present disclosure. The device 1205 may be an example of or include the components of a device 905, a device 1005, or a network entity 105 as described herein. The device 1205 may communicate wirelessly with one or more network entities 105 (e.g., base stations), UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting feedback based on indicated feedback process identifiers). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other network entities 105 (e.g., base stations), and may include a controller or scheduler for controlling communications with UEs 115 in cooperation with other network entities 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, control signaling indicating that the UE is to provide feedback corresponding to a set of multiple feedback process identifiers for at least one component carrier. The communications manager 1220 may be configured as or otherwise support a means for transmitting, to the UE, a cancellation indication indicating cancellation of a scheduled uplink transmission in which the UE is scheduled to provide feedback data corresponding to a subset of the set of multiple feedback process identifiers. The communications manager 1220 may be configured as or otherwise support a means for transmitting, to the UE, a control message scheduling the UE to transmit the feedback data corresponding to the subset of the set of multiple feedback process identifiers (e.g., based on the cancellation indication). In some examples, the subset of the set of feedback process identifiers may exclude at least one feedback process identifier of the set of feedback process identifiers. The communications manager 1220 may be configured as or otherwise support a means for receiving, from the UE, a feedback message including the feedback data for the subset of the set of multiple feedback process identifiers based on the control message.

By including or configuring the communications manager 1220 in accordance with examples as described herein, the device 1205 may support techniques for the communications manager 1220 to receive feedback that was scheduled to be provided by an uplink transmission that was subsequently canceled by a cancellation indication. Additionally, the device 1205 may support techniques for the communications manager 1220 to receive the feedback message with reduced overhead as compared to receiving feedback for each feedback process identifier of each component carrier.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of feedback based on indicated feedback process identifiers as described herein, or the processor 1240 and the memory 1230 may be otherwise configured to perform or support such operations.

Figure 13:
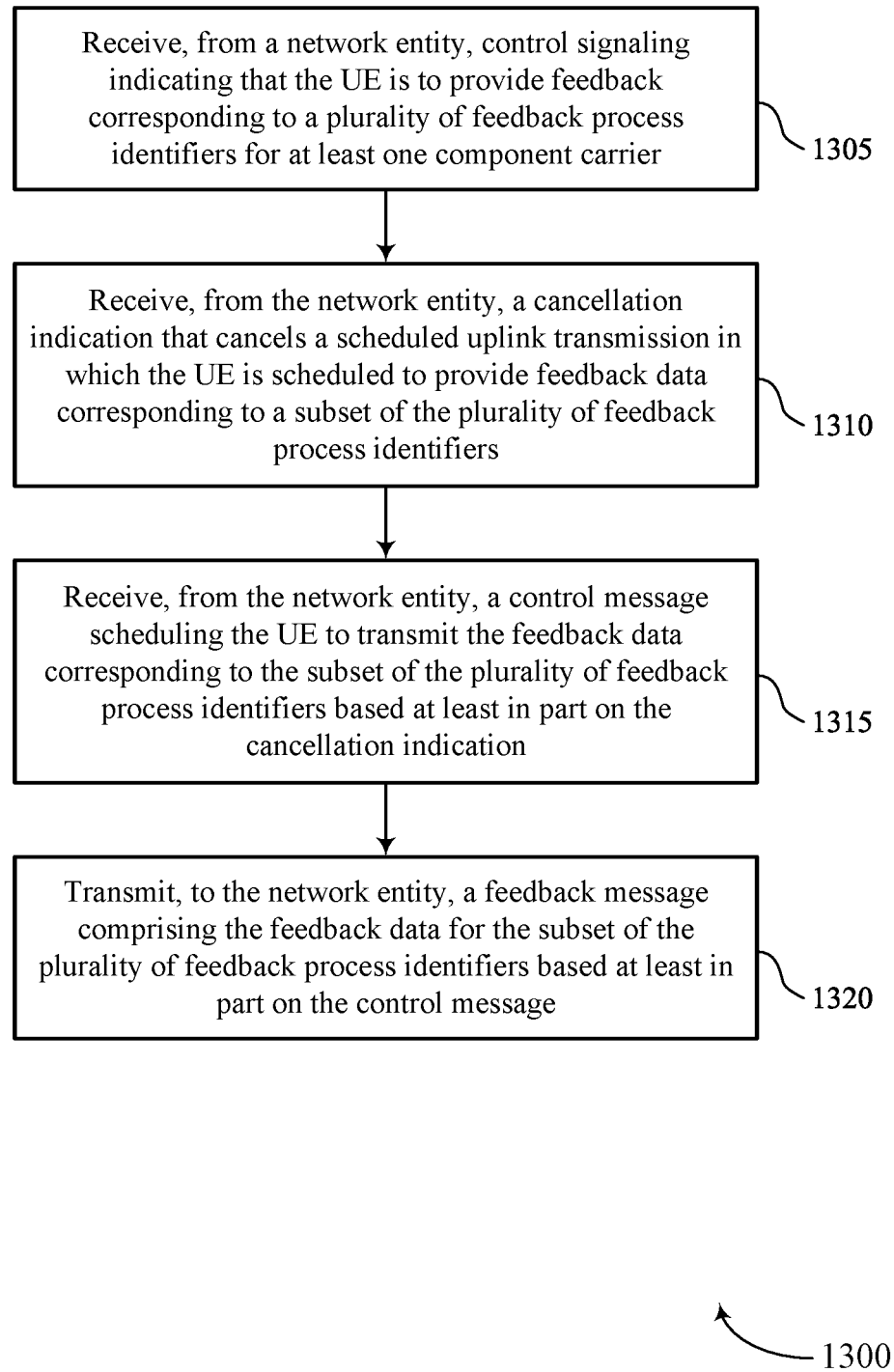
FIGS. 13 through 18 show flowcharts illustrating methods that support feedback based on indicated feedback process identifiers in accordance with aspects of the present disclosure.

FIG. 13 shows a flowchart illustrating a method 1300 that supports feedback based on indicated feedback process identifiers in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a network entity, control signaling indicating that the UE is to provide feedback corresponding to a plurality of (e.g., a set of multiple) feedback process identifiers for at least one component carrier. The operations of 1305 may be performed in accordance with examples as disclosed herein. In some examples, aspects of the operations of 1305 may be performed by a control signaling receiver 725 as described with reference to FIG. 7.

At 1310, the method may include receiving, from the network entity, a cancellation indication that cancels a scheduled uplink transmission in which the UE is scheduled to provide feedback data corresponding to a subset of the plurality of feedback process identifiers. The operations of 1310 may be performed in accordance with examples as disclosed herein. In some examples, aspects of the operations of 1310 may be performed by a cancellation indication receiver 730 as described with reference to FIG. 7.

At 1315, the method may include receiving, from the network entity, a control message scheduling the UE to transmit the feedback data corresponding to the subset of the plurality of feedback process identifiers based at least in part on the cancellation indication. The operations of 1315 may be performed in accordance with examples as disclosed herein. In some examples, aspects of the operations of 1315 may be performed by a control message receiver 735 as described with reference to FIG. 7.

At 1320, the method may include transmitting, to the network entity, a feedback message including the feedback data for the subset of the plurality of feedback process identifiers based at least in part on the control message. The operations of 1320 may be performed in accordance with examples as disclosed herein. In some examples, aspects of the operations of 1320 may be performed by a feedback message transmitter 740 as described with reference to FIG. 7.

Figure 14:
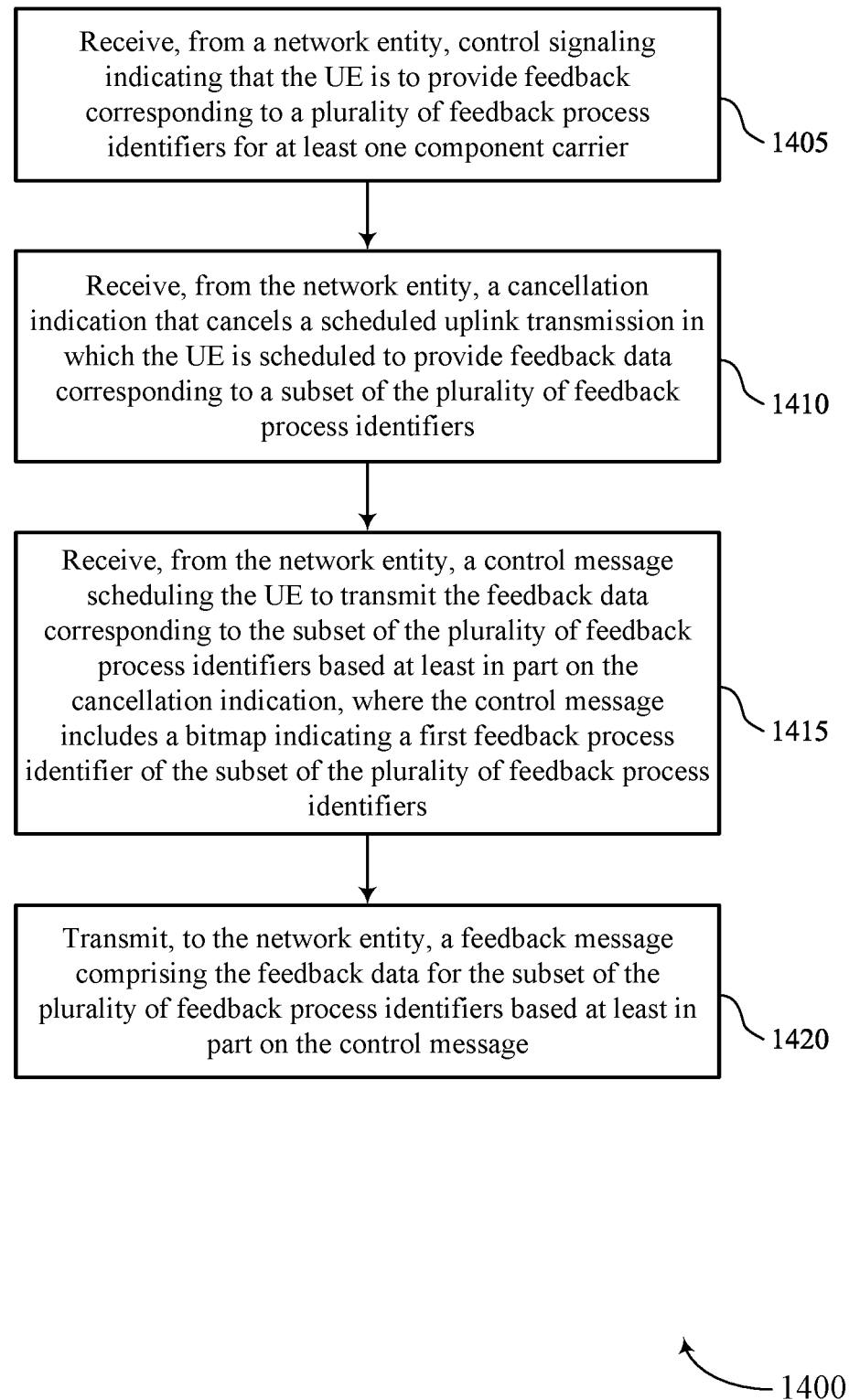

FIG. 14 shows a flowchart illustrating a method 1400 that supports feedback based on indicated feedback process identifiers in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a network entity, control signaling indicating that the UE is to provide feedback corresponding to a plurality of (e.g., a set of multiple) feedback process identifiers for at least one component carrier. The operations of 1405 may be performed in accordance with examples as disclosed herein. In some examples, aspects of the operations of 1405 may be performed by a control signaling receiver 725 as described with reference to FIG. 7.

At 1410, the method may include receiving, from the network entity, a cancellation indication that cancels a scheduled uplink transmission in which the UE is scheduled to provide feedback data corresponding to a subset of the plurality of feedback process identifiers. The operations of 1410 may be performed in accordance with examples as disclosed herein. In some examples, aspects of the operations of 1410 may be performed by a cancellation indication receiver 730 as described with reference to FIG. 7.

At 1415, the method may include receiving, from the network entity, a control message scheduling the UE to transmit the feedback data corresponding to the subset of the plurality of feedback process identifiers based at least in part on the cancellation indication, where the control message includes a bitmap indicating a first feedback process identifier of the subset of the plurality of feedback process identifiers. The operations of 1415 may be performed in accordance with examples as disclosed herein. In some examples, aspects of the operations of 1415 may be performed by a control message receiver 735 as described with reference to FIG. 7.

At 1420, the method may include transmitting, to the network entity, a feedback message including the feedback data for the subset of the plurality of feedback process identifiers based at least in part on the control message. The operations of 1420 may be performed in accordance with examples as disclosed herein. In some examples, aspects of the operations of 1420 may be performed by a feedback message transmitter 740 as described with reference to FIG. 7.

Figure 15:
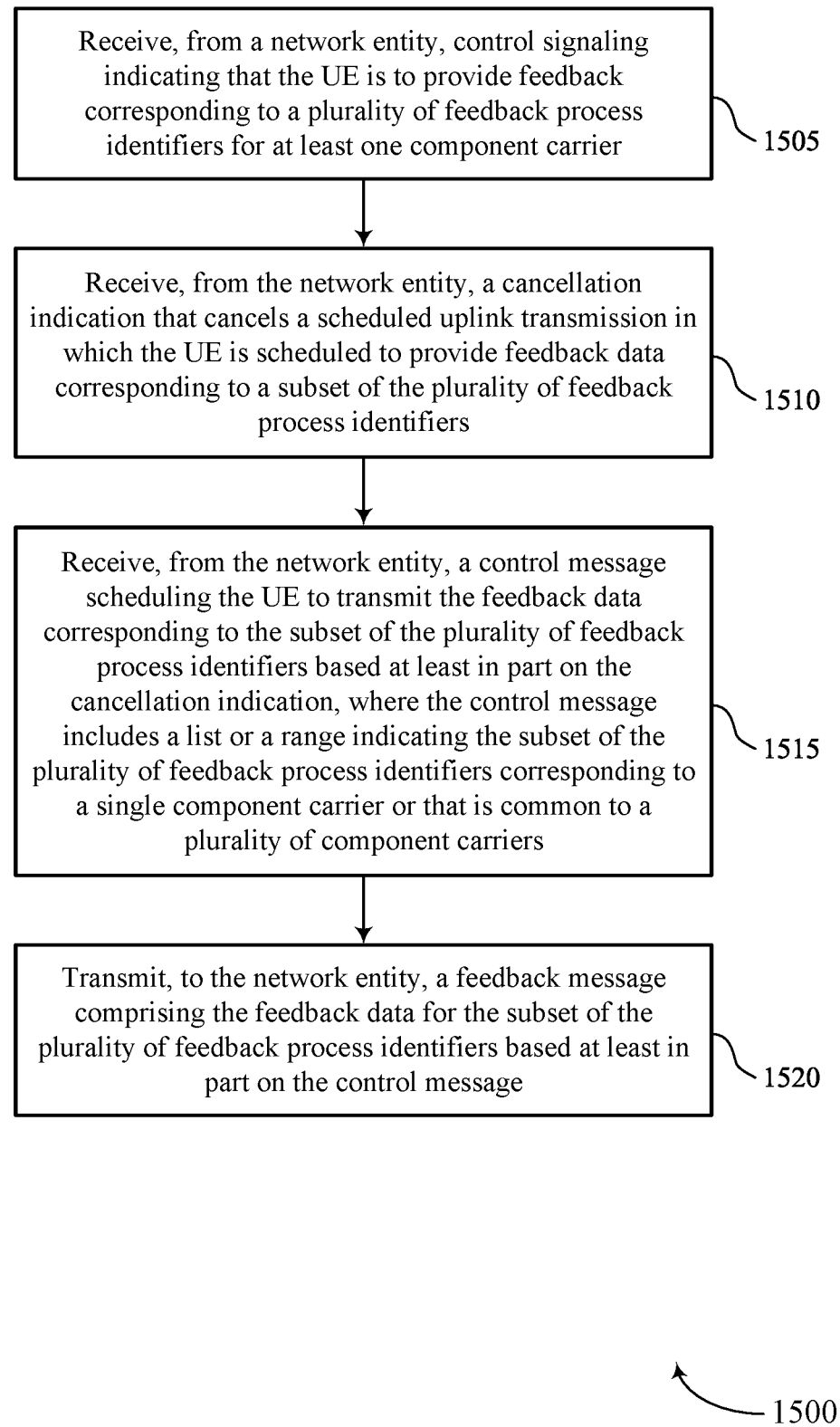

FIG. 15 shows a flowchart illustrating a method 1500 that supports feedback based on indicated feedback process identifiers in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a network entity, control signaling indicating that the UE is to provide feedback corresponding to a plurality of (e.g., a set of multiple) feedback process identifiers for at least one component carrier. The operations of 1505 may be performed in accordance with examples as disclosed herein. In some examples, aspects of the operations of 1505 may be performed by a control signaling receiver 725 as described with reference to FIG. 7.

At 1510, the method may include receiving, from the network entity, a cancellation indication that cancels a scheduled uplink transmission in which the UE is scheduled to provide feedback data corresponding to a subset of the plurality of feedback process identifiers. The operations of 1510 may be performed in accordance with examples as disclosed herein. In some examples, aspects of the operations of 1510 may be performed by a cancellation indication receiver 730 as described with reference to FIG. 7.

At 1515, the method may include receiving, from the network entity, a control message scheduling the UE to transmit the feedback data corresponding to the subset of the plurality of feedback process identifiers based at least in part on the cancellation indication, where the control message includes a list or a range indicating the subset of the plurality of feedback process identifiers corresponding to a single component carrier or that is common to a plurality of component carriers. The operations of 1515 may be performed in accordance with examples as disclosed herein. In some examples, aspects of the operations of 1515 may be performed by a control message receiver 735 as described with reference to FIG. 7.

At 1520, the method may include transmitting, to the network entity, a feedback message including the feedback data for the subset of the plurality of feedback process identifiers based at least in part on the control message. The operations of 1520 may be performed in accordance with examples as disclosed herein. In some examples, aspects of the operations of 1520 may be performed by a feedback message transmitter 740 as described with reference to FIG. 7.

Figure 16:
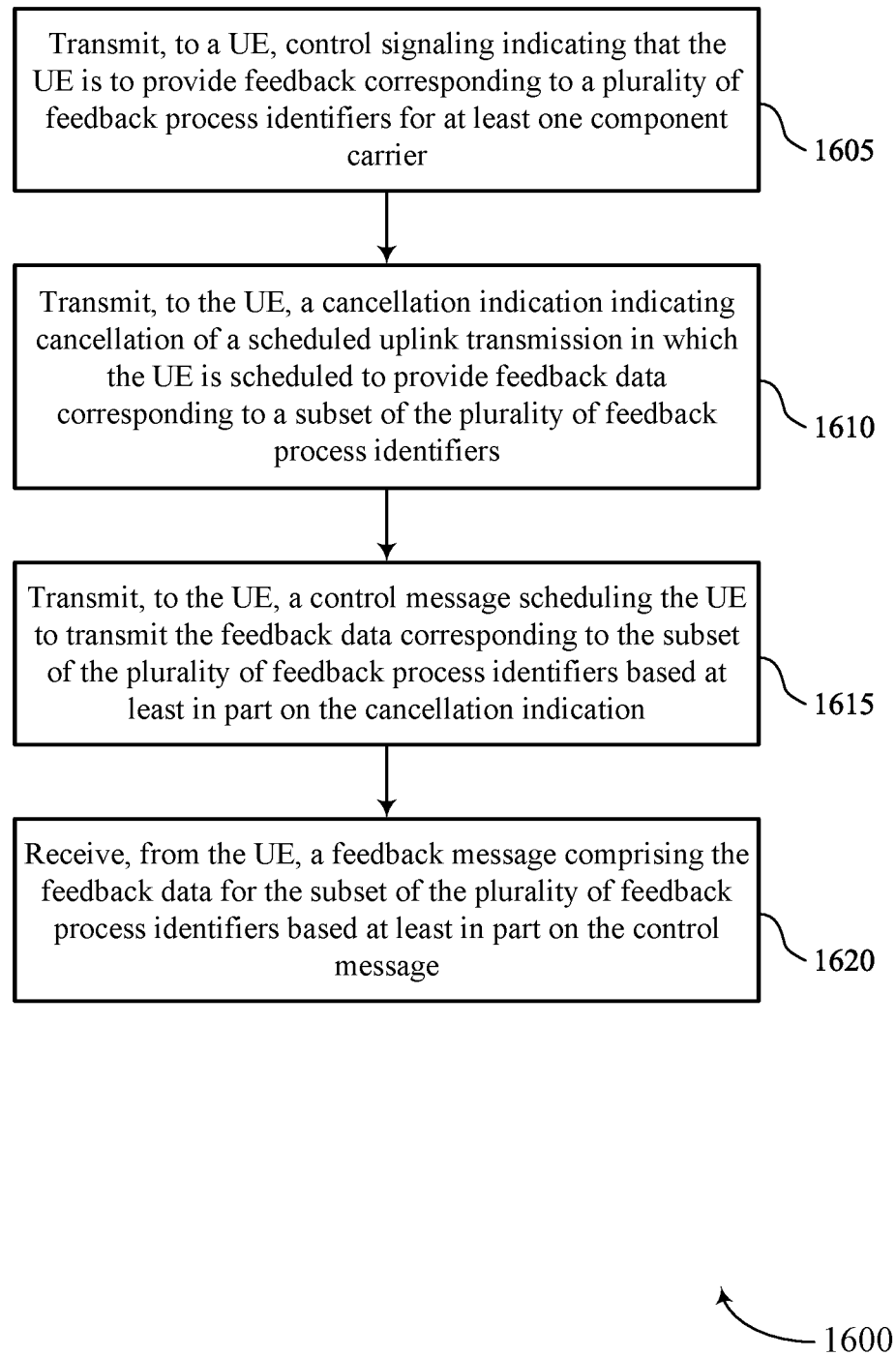

FIG. 16 shows a flowchart illustrating a method 1600 that supports feedback based on indicated feedback process identifiers in accordance with aspects of the present disclosure. The operations of the method 1600 may be implemented by a network entity or its components as described herein. For example, the operations of the method 1600 may be performed by a network entity 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1605, the method may include transmitting, to a UE, control signaling indicating that the UE is to provide feedback corresponding to a plurality of (e.g., a set of multiple) feedback process identifiers for at least one component carrier. The operations of 1605 may be performed in accordance with examples as disclosed herein. In some examples, aspects of the operations of 1605 may be performed by a control signaling transmitter 1125 as described with reference to FIG. 11.

At 1610, the method may include transmitting, to the UE, a cancellation indication indicating cancellation of a scheduled uplink transmission in which the UE is scheduled to provide feedback data corresponding to a subset of the plurality of feedback process identifiers. The operations of 1610 may be performed in accordance with examples as disclosed herein. In some examples, aspects of the operations of 1610 may be performed by a cancellation indication transmitter 1130 as described with reference to FIG. 11.

At 1615, the method may include transmitting, to the UE, a control message scheduling the UE to transmit the feedback data corresponding to the subset of the plurality of feedback process identifiers based at least in part on the cancellation indication. The operations of 1615 may be performed in accordance with examples as disclosed herein. In some examples, aspects of the operations of 1615 may be performed by a control message transmitter 1135 as described with reference to FIG. 11.

At 1620, the method may include receiving, from the UE, a feedback message including the feedback data for the subset of the plurality of feedback process identifiers based at least in part on the control message. The operations of 1620 may be performed in accordance with examples as disclosed herein. In some examples, aspects of the operations of 1620 may be performed by a feedback message receiver 1140 as described with reference to FIG. 11.

Figure 17:
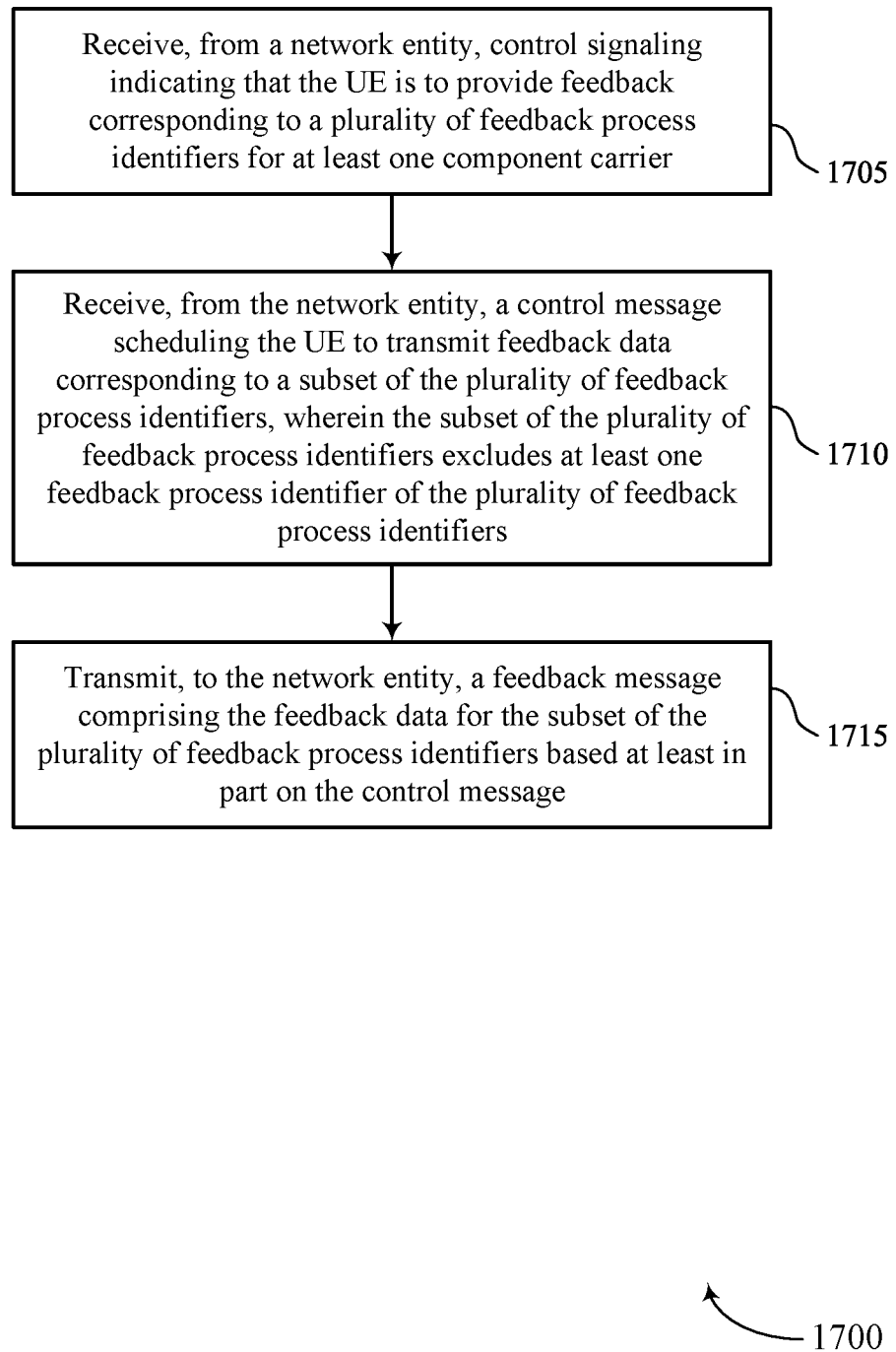

FIG. 17 shows a flowchart illustrating a method 1700 that supports feedback based on indicated feedback process identifiers in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a network entity, control signaling indicating that the UE is to provide feedback corresponding to a plurality of feedback process identifiers for at least one component carrier. The operations of 1705 may be performed in accordance with examples as disclosed herein. In some examples, aspects of the operations of 1705 may be performed by a control signaling receiver 725 as described with reference to FIG. 7.

At 1710, the method may include receiving, from the network entity, a control message scheduling the UE to transmit feedback data corresponding to a subset of the plurality of feedback process identifiers, wherein the subset of the plurality of feedback process identifiers excludes at least one feedback process identifier of the plurality of feedback process identifiers. The operations of 1710 may be performed in accordance with examples as disclosed herein. In some examples, aspects of the operations of 1710 may be performed by a control message receiver 735 as described with reference to FIG. 7.

At 1715, the method may include transmitting, to the network entity, a feedback message comprising the feedback data for the subset of the plurality of feedback process identifiers based at least in part on the control message. The operations of 1715 may be performed in accordance with examples as disclosed herein. In some examples, aspects of the operations of 1715 may be performed by a feedback message transmitter 740 as described with reference to FIG. 7.

Figure 18:
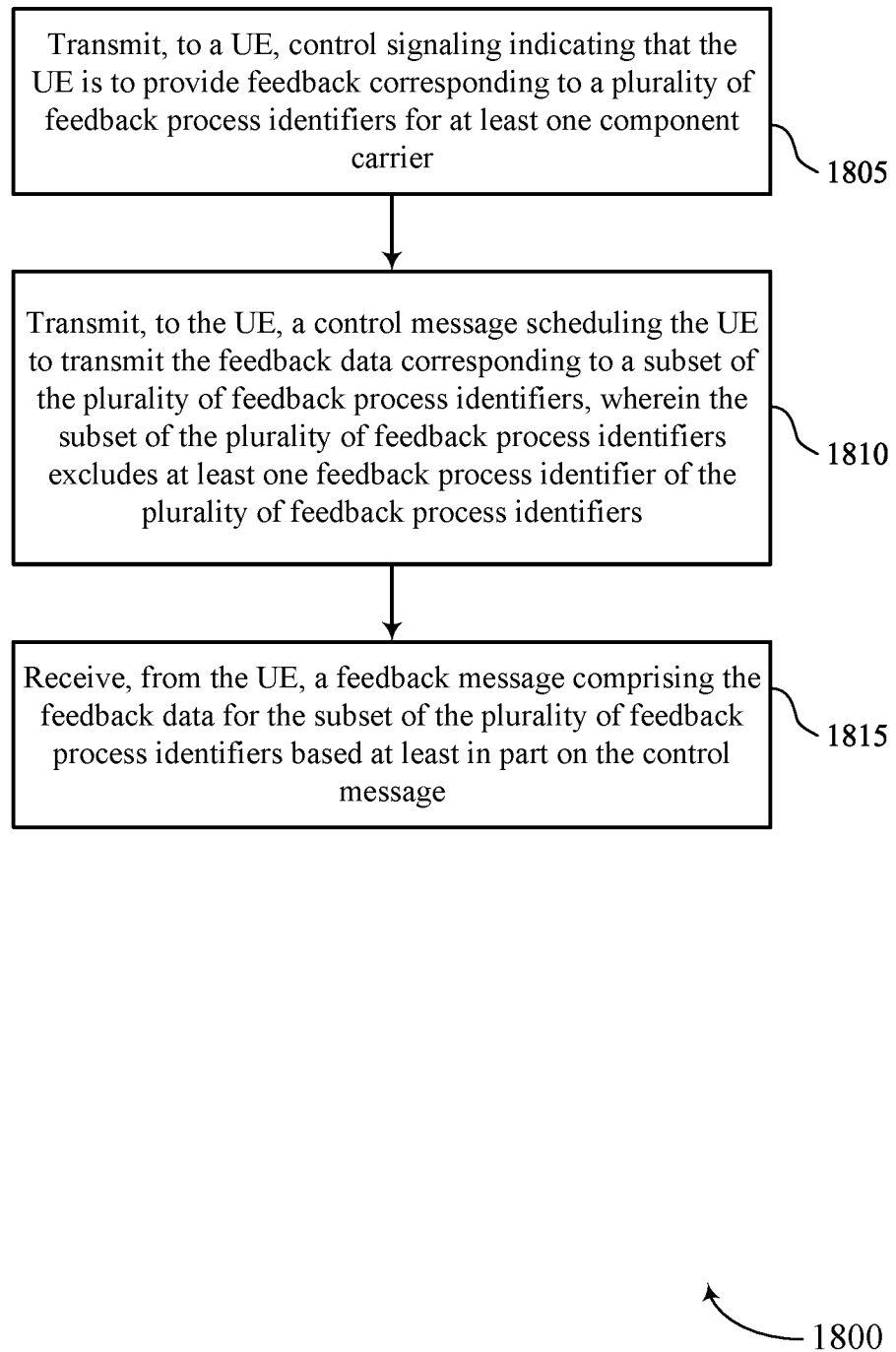

FIG. 18 shows a flowchart illustrating a method 1800 that supports feedback based on indicated feedback process identifiers in accordance with aspects of the present disclosure. The operations of the method 1800 may be implemented by a network entity or its components as described herein. For example, the operations of the method 1800 may be performed by a network entity 105 as described with reference to FIGS. 1 through 4 and 9 through 12. In some examples, a network entity may execute a set of instructions to control the functional elements of the network entity to perform the described functions. Additionally or alternatively, the network entity may perform aspects of the described functions using special-purpose hardware.

At 1805, the method may include transmitting, to a UE, control signaling indicating that the UE is to provide feedback corresponding to a plurality of feedback process identifiers for at least one component carrier. The operations of 1805 may be performed in accordance with examples as disclosed herein. In some examples, aspects of the operations of 1805 may be performed by a control signaling transmitter 1125 as described with reference to FIG. 11.

At 1810, the method may include transmitting, to the UE, a control message scheduling the UE to transmit the feedback data corresponding to a subset of the plurality of feedback process identifiers, wherein the subset of the plurality of feedback process identifiers excludes at least one feedback process identifier of the plurality of feedback process identifiers. The operations of 1810 may be performed in accordance with examples as disclosed herein. In some examples, aspects of the operations of 1810 may be performed by a control message transmitter 1135 as described with reference to FIG. 11.

At 1815, the method may include receiving, from the UE, a feedback message comprising the feedback data for the subset of the plurality of feedback process identifiers based at least in part on the control message. The operations of 1815 may be performed in accordance with examples as disclosed herein. In some examples, aspects of the operations of 1815 may be performed by a feedback message receiver 1140 as described with reference to FIG. 11.

The following provides an overview of aspects of the present disclosure:

Aspect 1: A method for wireless communication at a UE, comprising: receiving, from a network entity (e.g., a base station), control signaling indicating that the UE is to provide feedback corresponding to a plurality of feedback process identifiers for at least one component carrier; receiving, from the network entity, a cancellation indication that cancels a scheduled uplink transmission in which the UE is scheduled to provide feedback data corresponding to a subset of the plurality of feedback process identifiers; receiving, from the network entity, a control message scheduling the UE to transmit the feedback data corresponding to the subset of the plurality of feedback process identifiers based at least in part on the cancellation indication; and transmitting, to the network entity, a feedback message comprising the feedback data for the subset of the plurality of feedback process identifiers based at least in part on the control message. Transmitting the feedback data for just the subset of the plurality of feedback process identifiers may be associated with reduced overhead as compared to transmitting feedback data for each of the plurality of feedback process identifiers.

Aspect 2: The method of aspect 1, wherein receiving the control message comprises: receiving the control message comprising a bitmap indicating a first feedback process identifier of the subset of the plurality of feedback process identifiers. Using a bitmap may be associated with reduced overhead as compared to explicitly indicating a value of a feedback process identifier.

Aspect 3: The method of any of aspects 1 through 2, wherein receiving the control message comprises: receiving the control message comprising a plurality of bitmaps that respectively correspond to a plurality of component carriers. Using multiple bitmaps for multiple CCs may enable a UE to determine which CC is associated with an indicated feedback process identifier without additional information.

Aspect 4: The method of any of aspects 1 through 3, wherein receiving the control message comprises: receiving the control message comprising a bitmap, wherein a first bit of the bitmap corresponds to a first feedback process identifier for each component carrier of a plurality of component carriers in which the first feedback process identifier is configured. Using a single bit of a bitmap to indicate feedback process identifiers for multiple CCs may be associated with reduced overhead as compared to using multiple bits to indicate feedback process identifiers for multiple CCs.

Aspect 5: The method of aspect 4, wherein transmitting the feedback message comprises: transmitting the feedback message comprising the feedback data for each component carrier of the plurality of component carriers in which the first feedback process identifier is configured based at least in part on the first bit having a first value.

Aspect 6: The method of any of aspects 1 through 5, wherein receiving the control message comprises: receiving the control message comprising a bitmap, wherein each bit in the bitmap corresponds to a respective feedback process identifier of the plurality of feedback process identifiers, wherein each feedback process identifier corresponding to a bit in the bitmap is in a same position of a respective order relative to a respective component carrier. Using a single bit of a bitmap to indicate feedback process identifiers for multiple CCs may be associated with reduced overhead as compared to using multiple bits to indicate feedback process identifiers for multiple CCs Aspect 7: The method of any of aspects 1 through 6, wherein receiving the control message comprises: receiving the control message comprising a bitmap, wherein a first bit of the bitmap corresponds to a first feedback process identifier for a first component carrier and a second bit of the bitmap corresponds to a second feedback process identifier for a second component carrier.

Aspect 8: The method of aspect 7, wherein transmitting the feedback message comprises: transmitting the feedback message comprising the feedback data for the first component carrier based at least in part on the first bit having a first value, for the second component carrier based at least in part on the second bit having the first value, or both.

Aspect 9: The method of any of aspects 1 through 8, wherein receiving the control message comprises: receiving the control message comprising a list or a range indicating the subset of the plurality of feedback process identifiers corresponding to a single component carrier or that is common to a plurality of component carriers.

Aspect 10: The method of any of aspects 1 through 9, wherein transmitting the feedback message comprises: transmitting the feedback message comprising first feedback bits corresponding to a first feedback process identifier concatenated with second feedback bits corresponding to a second feedback process identifier.

Aspect 11: The method of any of aspects 1 through 10, wherein receiving the control message comprises: receiving the control message comprising an indication of a type of feedback codebook, wherein the feedback data is generated in accordance with the indicated type of the feedback codebook.

Aspect 12: The method of any of aspects 1 through 11, wherein receiving the control message comprises: receiving downlink control information comprising the control message, medium access control (MAC) control element signaling comprising the control message, or radio resource control signaling comprising the control message.

Aspect 13: The method of any of aspects 1 through 12, wherein receiving the cancellation indication comprises: receiving downlink control information comprising the cancellation indication.

Aspect 14: The method of any of aspects 1 through 13, wherein transmitting the feedback message comprises: transmitting an uplink control channel transmission comprising the feedback message.

Aspect 15: A method for wireless communication at a network entity (e.g., a base station), comprising: transmitting, to a UE, control signaling indicating that the UE is to provide feedback corresponding to a plurality of feedback process identifiers for at least one component carrier; transmitting, to the UE, a cancellation indication indicating cancellation of a scheduled uplink transmission in which the UE is scheduled to provide feedback data corresponding to a subset of the plurality of feedback process identifiers; transmitting, to the UE, a control message scheduling the UE to transmit the feedback data corresponding to the subset of the plurality of feedback process identifiers based at least in part on the cancellation indication; and receiving, from the UE, a feedback message comprising the feedback data for the subset of the plurality of feedback process identifiers based at least in part on the control message. Receiving the feedback data for just the subset of the plurality of feedback process identifiers may be associated with reduced overhead as compared to receiving feedback data for each of the plurality of feedback process identifiers.

Aspect 16: The method of aspect 15, wherein transmitting the control message comprises: transmitting the control message comprising a bitmap indicating a first feedback process identifier of the subset of the plurality of feedback process identifiers.

Aspect 17: The method of any of aspects 15 through 16, wherein transmitting the control message comprises: transmitting the control message comprising a plurality of bitmaps that respectively correspond to a plurality of component carriers.

Aspect 18: The method of any of aspects 15 through 17, wherein transmitting the control message comprises: transmitting the control message comprising a bitmap, wherein a first bit of the bitmap corresponds to a first feedback process identifier for each component carrier of a plurality of component carriers in which the first feedback process identifier is configured.

Aspect 19: The method of aspect 18, wherein receiving the feedback message comprises: receiving the feedback message comprising the feedback data for each component carrier of the plurality of component carriers in which the first feedback process identifier is configured based at least in part on the first bit having a first value.

Aspect 20: The method of any of aspects 15 through 19, wherein transmitting the control message comprises: transmitting the control message comprising a bitmap, each bit in the bitmap corresponds to a respective feedback process identifier of the plurality of feedback process identifiers, wherein each feedback process identifier corresponding to a bit in the bitmap is in a same position of a respective order relative to a respective component carrier.

Aspect 21: The method of any of aspects 15 through 20, wherein transmitting the control message comprises: transmitting the control message comprising a bitmap, wherein a first bit of the bitmap corresponds to a first feedback process identifier for a first component carrier and a second bit of the bitmap corresponds to a second feedback process identifier for a second component carrier.

Aspect 22: The method of aspect 21, wherein receiving the feedback message comprises: receiving the feedback message comprising the feedback data for the first component carrier based at least in part on the first bit having a first value, for the second component carrier based at least in part on the second bit having the first value, or both.

Aspect 23: The method of any of aspects 15 through 22, wherein transmitting the control message comprises: transmitting the control message comprising a list or a range indicating the subset of the plurality of feedback process identifiers corresponding to a single component carrier or that is common to a plurality of component carriers.

Aspect 24: The method of any of aspects 15 through 23, wherein receiving the feedback message comprises: receiving the feedback message comprising first feedback bits corresponding to a first feedback process identifier concatenated with second feedback bits corresponding to a second feedback process identifier.

Aspect 25: The method of any of aspects 15 through 24, wherein transmitting the control message comprises: transmitting the control message comprising an indication of a type of feedback codebook, wherein the feedback data is associated with the indicated type of the feedback codebook.

Aspect 26: The method of any of aspects 15 through 25, wherein transmitting the control message comprises: transmitting downlink control information comprising the control message, medium access control (MAC) control element signaling comprising the control message, or radio resource control signaling comprising the control message.

Aspect 27: The method of any of aspects 15 through 26, wherein transmitting the cancellation indication comprises: transmitting downlink control information comprising the cancellation indication.

Aspect 28: The method of any of aspects 15 through 27, wherein receiving the feedback message comprises: receiving an uplink control channel transmission comprising the feedback message.

Aspect 29: An apparatus for wireless communication at a UE, comprising at least one processor; memory coupled to the at least one processor, the memory storing instructions executable by the at least one processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by at least one processor to perform a method of any of aspects 1 through 14.

Aspect 32: An apparatus for wireless communication at a network entity, comprising at least one processor and memory coupled to the at least one processor, the memory storing instructions executable by the at least one processor to cause the apparatus to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by at least one processor to perform a method of any of aspects 15 through 28.

Aspect 35: A method for wireless communication at a UE, comprising: receiving, from a network entity, control signaling indicating that the UE is to provide feedback corresponding to a plurality of feedback process identifiers for at least one component carrier; receiving, from the network entity, a control message scheduling the UE to transmit feedback data corresponding to a subset of the plurality of feedback process identifiers, wherein the subset of the plurality of feedback process identifiers excludes at least one feedback process identifier of the plurality of feedback process identifiers; and transmitting, to the network entity, a feedback message comprising the feedback data for the subset of the plurality of feedback process identifiers based at least in part on the control message. Transmitting the feedback data for just the subset of the plurality of feedback process identifiers may be associated with reduced overhead as compared to transmitting feedback data for each of the plurality of feedback process identifiers.

Aspect 36: The method of aspect 35, further comprising: receiving, from the network entity, a cancellation indication that cancels a scheduled uplink transmission in which the UE is scheduled to provide feedback data corresponding to the subset of the plurality of feedback process identifiers, wherein receiving the control message scheduling the UE to transmit the feedback data corresponding to the subset of the plurality of feedback process identifiers is based at least in part on the cancellation indication.

Aspect 37: The method of any of aspects 35 through 36, wherein receiving the control message comprises: receiving the control message comprising a bitmap indicating a first feedback process identifier of the subset of the plurality of feedback process identifiers.

Aspect 38: The method of any of aspects 35 through 37, wherein receiving the control message comprises: receiving the control message comprising a plurality of bitmaps that respectively correspond to a plurality of component carriers.

Aspect 39: The method of any of aspects 35 through 38, wherein receiving the control message comprises: receiving the control message comprising a bitmap, wherein a first bit of the bitmap corresponds to a first feedback process identifier for each component carrier of a plurality of component carriers in which the first feedback process identifier is configured.

Aspect 40: The method of aspect 39, wherein transmitting the feedback message comprises: transmitting the feedback message comprising the feedback data for each component carrier of the plurality of component carriers in which the first feedback process identifier is configured based at least in part on the first bit having a first value.

Aspect 41: The method of any of aspects 35 through 40, wherein receiving the control message comprises: receiving the control message comprising a bitmap, each bit in the bitmap corresponds to a respective feedback process identifier of the plurality of feedback process identifiers, wherein each feedback process identifier corresponding to a bit in the bitmap is in a same position of a respective order relative to a respective component carrier.

Aspect 42: The method of any of aspects 35 through 41, wherein receiving the control message comprises: receiving the control message comprising a first bitmap indicating one or more first feedback process identifiers of the subset of the plurality of feedback process identifiers, a plurality of bitmaps that respective correspond to a plurality of component carriers, or a second bitmap, wherein a first bit of the second bitmap corresponds to a first feedback process identifier for each component carrier of the plurality of component carriers in which the first feedback process identifier is configured.

Aspect 43: The method of any of aspects 35 through 42, wherein receiving the control message comprises: receiving the control message comprising a bitmap, wherein a first bit of the bitmap corresponds to a first feedback process identifier for a first component carrier and a second bit of the bitmap corresponds to a second feedback process identifier for a second component carrier.

Aspect 44: The method of aspect 43, wherein transmitting the feedback message comprises: transmitting the feedback message comprising the feedback data for the first component carrier based at least in part on the first bit having a first value, for the second component carrier based at least in part on the second bit having the first value, or both.

Aspect 45: The method of any of aspects 35 through 44, wherein receiving the control message comprises: receiving the control message comprising a list or a range indicating the subset of the plurality of feedback process identifiers corresponding to a single component carrier or that is common to a plurality of component carriers.

Aspect 46: The method of any of aspects 35 through 45, wherein transmitting the feedback message comprises: transmitting the feedback message comprising first feedback bits corresponding to a first feedback process identifier concatenated with second feedback bits corresponding to a second feedback process identifier.

Aspect 47: The method of any of aspects 35 through 46, wherein receiving the control message comprises: receiving the control message comprising an indication of a type of feedback codebook, wherein the feedback data is generated in accordance with the indicated type of the feedback codebook.

Aspect 48: The method of any of aspects 35 through 47, wherein receiving the control message comprises: receiving downlink control information comprising the control message, medium access control (MAC) control element signaling comprising the control message, or radio resource control signaling comprising the control message.

Aspect 49: The method of any of aspects 35 through 48, wherein transmitting the feedback message comprises: transmitting an uplink control channel transmission comprising the feedback message.

Aspect 50: The method of any of aspects 35 through 49, wherein a first resource scheduled by the control signaling for providing the feedback is different than a second resource over which the feedback message is transmitted based at least in part on receiving the control message.

Aspect 51: A method for wireless communication at a network entity, comprising: transmitting, to a UE, control signaling indicating that the UE is to provide feedback corresponding to a plurality of feedback process identifiers for at least one component carrier; transmitting, to the UE, a control message scheduling the UE to transmit the feedback data corresponding to a subset of the plurality of feedback process identifiers, wherein the subset of the plurality of feedback process identifiers excludes at least one feedback process identifier of the plurality of feedback process identifiers; and receiving, from the UE, a feedback message comprising the feedback data for the subset of the plurality of feedback process identifiers based at least in part on the control message. Receiving the feedback data for just the subset of the plurality of feedback process identifiers may be associated with reduced overhead as compared to receiving feedback data for each of the plurality of feedback process identifiers.

Aspect 52: The method of aspect 51, further comprising: transmitting, to the UE, a cancellation indication that cancels a scheduled uplink transmission in which the UE is scheduled to provide feedback data corresponding to the subset of the plurality of feedback process identifiers, wherein transmitting the control message scheduling the UE to transmit the feedback data corresponding to the subset of the plurality of feedback process identifiers is based at least in part on the cancellation indication.

Aspect 53: The method of any of aspects 51 or 52, wherein a first resource scheduled by the control signaling for providing the feedback is different than a second resource over which the feedback message is transmitted based at least in part on receiving the control message.

Aspect 54: An apparatus for wireless communication at a UE, comprising a processor; memory coupled with the processor; and instructions stored in the memory and executable by the processor to cause the apparatus to perform a method of any of aspects 35 through 50.

Aspect 55: An apparatus for wireless communication at a UE, comprising at least one means for performing a method of any of aspects 35 through 50.

Aspect 56: A non-transitory computer-readable medium storing code for wireless communication at a UE, the code comprising instructions executable by a processor to perform a method of any of aspects 35 through 50.

Aspect 57: An apparatus for wireless communication at a network entity, comprising a processor; memory coupled with the processor; and instructions stored in the memory and executable by the processor to cause the apparatus to perform a method of any of aspects 51 through 53.

Aspect 58: An apparatus for wireless communication at a network entity, comprising at least one means for performing a method of any of aspects 51 through 53.

Aspect 59: A non-transitory computer-readable medium storing code for wireless communication at a network entity, the code comprising instructions executable by a processor to perform a method of any of aspects 51 through 53.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software (e.g., executed by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a wide variety of actions and, therefore, "determining" can include calculating, computing, processing, deriving, investigating, looking up (such as via looking up in a table, a database or another data structure), and ascertaining among other actions. Also, "determining" can include receiving (such as receiving information), and accessing (such as accessing data in a memory) among other actions. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving, from a network entity, control signaling indicating that the UE is to provide feedback corresponding to a plurality of feedback process identifiers for at least one component carrier;
    receiving, from the network entity, a control message scheduling the UE to transmit feedback data corresponding to a subset of the plurality of feedback process identifiers, wherein the subset of the plurality of feedback process identifiers excludes at least one feedback process identifier of the plurality of feedback process identifiers, and wherein the control message comprises a list indicating the subset of the plurality of feedback process identifiers corresponding to a single component carrier; and
    transmitting, to the network entity, a feedback message comprising the feedback data corresponding to the subset of the plurality of feedback process identifiers based at least in part on the control message.

2. The method of claim 1, further comprising:
    receiving, from the network entity, a cancellation indication that cancels a scheduled uplink transmission in which the UE is scheduled to provide feedback data corresponding to the subset of the plurality of feedback process identifiers, wherein receiving the control message scheduling the UE to transmit the feedback data corresponding to the subset of the plurality of feedback process identifiers is based at least in part on the cancellation indication.

3. The method of claim 1, wherein receiving the control message comprises:
    receiving the control message comprising a first bitmap indicating one or more first feedback process identifiers of the subset of the plurality of feedback process identifiers, a plurality of bitmaps that respective correspond to a plurality of component carriers, or a second bitmap, wherein a first bit of the second bitmap corresponds to a first feedback process identifier for each component carrier of the plurality of component carriers in which the first feedback process identifier is configured.

4. The method of claim 3, wherein transmitting the feedback message comprises:
    transmitting the feedback message comprising the feedback data for each component carrier of the plurality of component carriers in which the first feedback process identifier is configured based at least in part on the first bit having a first value.

5. The method of claim 1, wherein receiving the control message comprises:
    receiving the control message comprising a bitmap, wherein each bit in the bitmap corresponds to a respective feedback process identifier of the plurality of feedback process identifiers, wherein each feedback process identifier corresponding to a bit in the bitmap is in a same position of a respective order relative to a respective component carrier.

6. The method of claim 1, wherein receiving the control message comprises:
receiving the control message comprising a bitmap, wherein a first bit of the bitmap corresponds to a first feedback process identifier for a first component carrier and a second bit of the bitmap corresponds to a second feedback process identifier for a second component carrier.

7. The method of claim 6, wherein transmitting the feedback message comprises:
transmitting the feedback message comprising the feedback data for the first component carrier based at least in part on the first bit having a first value, for the second component carrier based at least in part on the second bit having the first value, or both.

8. The method of claim 1, wherein transmitting the feedback message comprises:
transmitting the feedback message comprising first feedback bits corresponding to a first feedback process identifier concatenated with second feedback bits corresponding to a second feedback process identifier.

9. The method of claim 1, wherein receiving the control message comprises:
receiving the control message comprising an indication of a type of feedback codebook, wherein the feedback data is generated in accordance with the indicated type of the feedback codebook.

10. The method of claim 1, wherein receiving the control message comprises:
receiving downlink control information comprising the control message, medium access control (MAC) control element signaling comprising the control message, or radio resource control signaling comprising the control message.

11. The method of claim 1, wherein transmitting the feedback message comprises:
transmitting an uplink control channel transmission comprising the feedback message.

12. The method of claim 1, wherein a first resource scheduled by the control signaling for providing the feedback is different than a second resource over which the feedback message is transmitted based at least in part on receiving the control message.

13. A method for wireless communication at a network entity, comprising:
transmitting, to a user equipment (UE), control signaling indicating that the UE is to provide feedback corresponding to a plurality of feedback process identifiers for at least one component carrier;
transmitting, to the UE, a control message scheduling the UE to transmit feedback data corresponding to a subset of the plurality of feedback process identifiers, wherein the subset of the plurality of feedback process identifiers excludes at least one feedback process identifier of the plurality of feedback process identifiers, and wherein the control message comprises a list indicating the subset of the plurality of feedback process identifiers corresponding to a single component carrier; and
receiving, from the UE, a feedback message comprising the feedback data corresponding to the subset of the plurality of feedback process identifiers based at least in part on the control message.

14. The method of claim 13, further comprising:
transmitting, to the UE, a cancellation indication that cancels a scheduled uplink transmission in which the UE is scheduled to provide feedback data corresponding to the subset of the plurality of feedback process identifiers, wherein transmitting the control message scheduling the UE to transmit the feedback data corresponding to the subset of the plurality of feedback process identifiers is based at least in part on the cancellation indication.

15. The method of claim 13, wherein a first resource scheduled by the control signaling for providing the feedback is different than a second resource over which the feedback message is transmitted based at least in part on receiving the control message.

16. An apparatus for wireless communication at a user equipment (UE), comprising:
at least one processor; and
memory coupled with the at least one processor, the memory storing instructions executable by the at least one processor to cause the apparatus to:
receive, from a network entity, control signaling indicating that the UE is to provide feedback corresponding to a plurality of feedback process identifiers for at least one component carrier;
receive, from the network entity, a control message scheduling the UE to transmit feedback data corresponding to a subset of the plurality of feedback process identifiers, wherein the subset of the plurality of feedback process identifiers excludes at least one feedback process identifier of the plurality of feedback process identifiers, and wherein the control message comprises a list indicating the subset of the plurality of feedback process identifiers corresponding to a single component carrier; and
transmit, to the network entity, a feedback message comprising the feedback data corresponding to the subset of the plurality of feedback process identifiers based at least in part on the control message.

17. The apparatus of claim 16, wherein the instructions are executable by the at least one processor to cause the apparatus to:
receive, from the network entity, a cancellation indication that cancels a scheduled uplink transmission in which the UE is scheduled to provide feedback data corresponding to the subset of the plurality of feedback process identifiers, wherein receiving the control message scheduling the UE to transmit the feedback data corresponding to the subset of the plurality of feedback process identifiers is based at least in part on the cancellation indication.

18. The apparatus of claim 16, wherein the instructions to receive the control message are executable by the at least one processor to cause the apparatus to:
receive the control message comprising a first bitmap indicating a first feedback process identifier of the subset of the plurality of feedback process identifiers, a plurality of bitmaps that respective correspond to a plurality of component carriers, or a second bitmap, wherein a first bit of the second bitmap corresponds to the first feedback process identifier for each component carrier of the plurality of component carriers in which the first feedback process identifier is configured.

19. The apparatus of claim 18, wherein the instructions to transmit the feedback message are executable by the at least one processor to cause the apparatus to:

transmit the feedback message comprising the feedback data for each component carrier of the plurality of component carriers in which the first feedback process identifier is configured based at least in part on the first bit having a first value.

20. The apparatus of claim 16, wherein the instructions to receive the control message are executable by the at least one processor to cause the apparatus to:
receive the control message comprising a first bitmap indicating one or more first feedback process identifiers of the subset of the plurality of feedback process identifiers, a plurality of bitmaps that respective correspond to a plurality of component carriers, or a second bitmap, wherein a first bit of the second bitmap corresponds to a first feedback process identifier for each component carrier of the plurality of component carriers in which the first feedback process identifier is configured.

21. The apparatus of claim 16, wherein the instructions to receive the control message are executable by the at least one processor to cause the apparatus to:
receive the control message comprising a bitmap, wherein a first bit of the bitmap corresponds to a first feedback process identifier for a first component carrier and a second bit of the bitmap corresponds to a second feedback process identifier for a second component carrier.

22. The apparatus of claim 21, wherein the instructions to transmit the feedback message are executable by the at least one processor to cause the apparatus to:
transmit the feedback message comprising the feedback data for the first component carrier based at least in part on the first bit having a first value, for the second component carrier based at least in part on the second bit having the first value, or both.

23. The apparatus of claim 16, wherein the instructions to transmit the feedback message are executable by the at least one processor to cause the apparatus to:
transmit the feedback message comprising first feedback bits corresponding to a first feedback process identifier concatenated with second feedback bits corresponding to a second feedback process identifier.

24. The apparatus of claim 16, wherein the instructions to receive the control message are executable by the at least one processor to cause the apparatus to:
receive the control message comprising an indication of a type of feedback codebook, wherein the feedback data is generated in accordance with the indicated type of the feedback codebook.

25. The apparatus of claim 16, wherein the instructions to receive the control message are executable by the at least one processor to cause the apparatus to:
receive downlink control information comprising the control message, medium access control (MAC) control element signaling comprising the control message, or radio resource control signaling comprising the control message.

26. The apparatus of claim 16, wherein the instructions to transmit the feedback message are executable by the at least one processor to cause the apparatus to:
transmit an uplink control channel transmission comprising the feedback message.

27. An apparatus for wireless communication at a network entity, comprising:
at least one processor; and
memory coupled with the at least one processor, the memory storing instructions executable by the at least one processor to cause the apparatus to:
transmit, to a user equipment (UE), control signaling indicating that the UE is to provide feedback corresponding to a plurality of feedback process identifiers for at least one component carrier;
transmit, to the UE, a control message scheduling the UE to transmit feedback data corresponding to a subset of the plurality of feedback process identifiers, wherein the subset of the plurality of feedback process identifiers excludes at least one feedback process identifier of the plurality of feedback process identifiers, and wherein the control message comprises a list indicating the subset of the plurality of feedback process identifiers corresponding to a single component carrier; and
receive, from the UE, a feedback message comprising the feedback data corresponding to the subset of the plurality of feedback process identifiers based at least in part on the control message.

28. The apparatus of claim 27, wherein the instructions are executable by the at least one processor to cause the apparatus to:
transmit, to the UE, a cancellation indication that cancels a scheduled uplink transmission in which the UE is scheduled to provide feedback data corresponding to the subset of the plurality of feedback process identifiers, wherein transmitting the control message scheduling the UE to transmit the feedback data corresponding to the subset of the plurality of feedback process identifiers is based at least in part on the cancellation indication.

* * * * *